(12) United States Patent
Zigoris

(10) Patent No.: US 10,062,074 B1
(45) Date of Patent: Aug. 28, 2018

(54) SYSTEM FOR IMPROVING CARD ON FILE TRANSACTIONS

(71) Applicant: Square, Inc., San Francisco, CA (US)

(72) Inventor: Philip Zigoris, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/365,637

(22) Filed: Nov. 30, 2016

(51) Int. Cl.
*G06Q 20/34* (2012.01)
*G06Q 20/20* (2012.01)
*G06Q 20/22* (2012.01)

(52) U.S. Cl.
CPC ....... *G06Q 20/3567* (2013.01); *G06Q 20/204* (2013.01)

(58) Field of Classification Search
USPC .......................................................... 705/17
See application file for complete search history.

(56) References Cited

U.S. PATENT DOCUMENTS

2016/0314465 A1* 10/2016 Martin ................. G06Q 20/405
2017/0046679 A1* 2/2017 Gotlieb .................. G06Q 20/20

* cited by examiner

*Primary Examiner* — Garcia Ade
(74) *Attorney, Agent, or Firm* — Lee & Hayes, PLLC

(57) ABSTRACT

Techniques and arrangements for improving card on file transactions are described. For instance, a payment service may receive, from one or more merchant devices, transaction information associated with at least one transaction between a merchant and a customer, where the transaction information includes at least payment information of a payment instrument used during respective transactions. The payment service may then analyze the transaction information to compute a value associated with a transaction characteristic as indicated by the transaction information, determine that the value exceeds a threshold value, and, based on determining that the value exceeds the threshold value, send the customer a message requesting that the customer store the payment information with the merchant. The value associated with the transaction characteristic can include a total number of transactions, a total cost of transactions, or a frequency associated with the transactions between the merchant and the customer.

20 Claims, 12 Drawing Sheets

SYSTEM FOR IMPROVING CARD ON FILE TRANSACTIONS

BACKGROUND

Merchants may conduct transactions for items and services with customers. To conduct a transaction with a customer, a merchant can use a point-of-sale (POS) device to receive payment from the customer, such as in the form of a payment instrument, and process the payment instrument for a cost of the transaction using a payment system. The merchant can then use the POS device to generate a receipt for the customer. The receipt can include a digital receipt that the POS device sends the customer via contact information of the customer, such as an email address of the customer. The customer can provide the merchant with the contact information at a time of the transaction.

In some cases, a merchant may request that the customer store information associated with the payment instrument on the POS device so that the customer is no longer required to provide the payment instrument during future transactions with the merchant. Rather, the merchant can use the stored information to process the payment instrument for a cost of a future transaction using the payment system. In some instances, using such a technique can improve the process of processing transactions, as the POS device is not required to read and/or send sensitive information during each transaction.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
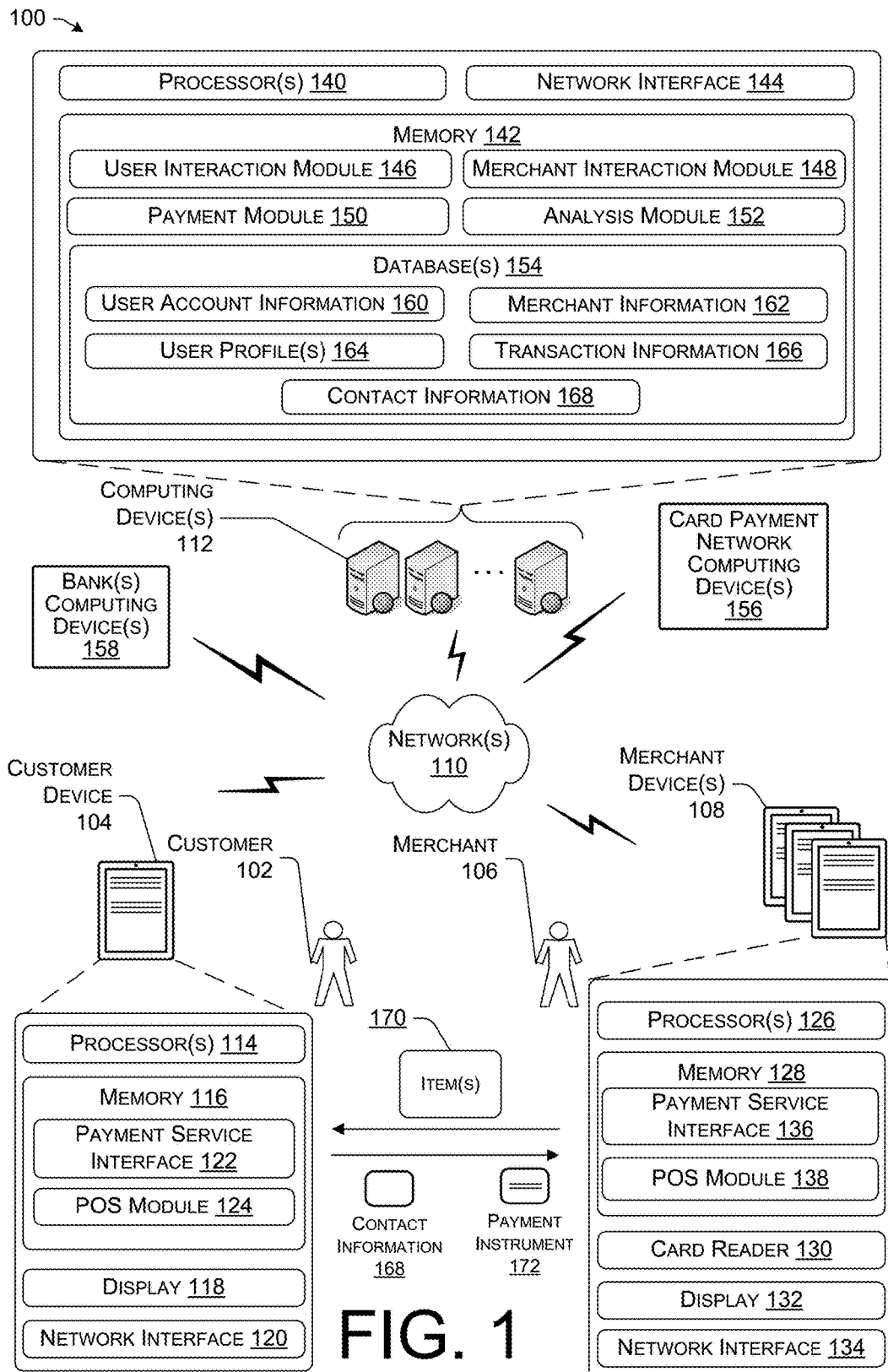
FIG. 1 illustrates an example system that includes a merchant conducting transactions with a customer for item(s), as well as a payment service to authorize a payment instrument of the customer for the transactions. In this system, the payment service receives payment information associated with the transactions from the merchant device(s). The payment service then stores the payment information and contact information for the customer in association with an identity of the customer. Additionally, the payment service analyzes the payment information using one or more algorithms to determine whether to send, to the customer, a message requesting that the customer store the payment information with the merchant.

This disclosure describes systems and processes for improving electronic card on file transactions. For instance, a merchant can conduct transactions with a customer using a point-of-sale (POS) device. During a respective transaction, the POS device can receive payment information associated with a payment instrument of the customer. For instance, the POS device can include a card reader that reads the payment information from the payment instrument. The POS device can then send a request to a payment service to authorize the payment instrument for a cost of the transaction, where the request includes the payment information. In response, the POS device can receive a message indicating whether the payment instrument was authorized for the cost of the transaction.

To improve the processing of transactions, the merchant may request to store the payment information associated with the payment instrument either locally on the POS device, or on the payment service. By storing the payment information, in some instances, the POS device may not be required to receive and/or read the payment information from the payment instrument during a respective transaction. Additionally, in some instances, the POS device may not be required to send the payment information, which includes sensitive information, to the payment service when processing the payment instrument during a respective transaction.

As such, the payment service can improve the processing of transactions by monitoring transaction activity between the merchant and the customer. While monitoring the transaction activity, the payment service can determine when to send the customer a message requesting to store the payment information in association with the merchant. Based on the determination, the payment service can send the message to the customer using contact information, receive an additional message from the customer requesting to store the payment information, and then provide the POS device with information that the POS device can use to charge the payment instrument during a future transaction.

For instance, the payment service can receive transaction information from the POS device associated with the merchant. The transaction information can describe one or more transactions between the merchant and the customer. For instance, the transaction information for a respective transaction can indicate an identifier (e.g., name) of the customer, the payment information associated with the payment instrument used by the customer during the respective transaction, item(s) acquired by the customer during the respective transaction, a cost of the item(s) acquired by the customer during the respective transaction, a time, place and date of the respective transaction, and so forth.

In addition to the transaction information, the payment service can receive contact information associated with the customer. The contact information can include an email address, telephone number, home address, fax number, or any other type of contact information that can be used to contact the customer. In some instances, the payment service receives the contact information from the POS device. For instance, the payment service can receive the contact information along with transaction information from the POS device. In some instances, the payment service receives the contact information from a device associated with the customer. For instance, the device may be executing an application that provides the customer with the capability to send the contact information to the payment service. In either instance, the payment service can then store the transaction information and the contact information in association with an identity of the customer.

For instance, the payment service can determine whether the customer has a profile stored in a database associated with the merchant. If the customer does not have a profile, then the payment service can generate a profile for the customer, and store the profile in the database. The payment service can then store, in the database, the transaction information and the contact information for the customer in association with the profile. In some instances, the payment service stores transaction information for a respective transaction each time the payment service receives a request to process a transaction from the POS device.

In some instances, the payment service analyzes the transaction information to determine a value associated with at least one transaction characteristic as indicated by the transaction information. A transaction characteristic can include a total number of transactions, a total cost of transactions, a frequency of transactions, or the like. As such, when analyzing the transaction information for the customer, the payment service can calculate at least one of: (1) a total number of transactions between the merchant and the customer, (2) a total cost of transactions between the merchant and the customer, or (3) a frequency in which transactions occur between the merchant and the customer. In some instances, the payment service analyzes the data using one or more algorithms that determine the values associated with the respective transaction characteristics.

The payment service can then determine whether one or more of the values exceed a respective threshold value associated with each of the transaction characteristics. For instance, the payment service can determine whether at least one of: (1) the total number of transactions between the merchant and the customer exceeds a transaction threshold (e.g., one transaction, two transaction, three transactions, etc.), (2) the total cost of the transactions between the merchant and the customer exceeds a cost threshold (e.g., $100, $1,000, $10,000, etc.), or (3) the frequency in which transactions occur between the merchant and the customer exceeds a frequency threshold (e.g., one transaction a week, three transactions a month, etc.). In some instances, the payment service may use a common threshold for each of the values for every merchant that the payment service analyzes. In some instances, the payment service may use varying thresholds based on one or more factors, such as a type of business that a respective merchant performs, a size of the respective merchant (e.g., annual sales, number of employees, etc.), or the like.

For example, while analyzing the transaction information for the customer, the payment service may determine that the total number of transactions is one, the total cost of the transactions is $50, and the frequency for transactions between the merchant and the customer is one per year (since there is only a single transaction in the example). The payment service can then determine whether one or more of the determined values exceeds a respective threshold value for the respective transaction characteristic. For instance, the payment service can determine whether one transaction exceeds the transaction threshold, whether $50 transactions exceeds the cost threshold, and/or whether one transaction per year exceeds the frequency threshold.

The payment service can then determine whether to send the customer a message, via the contact information, requesting that the customer save the payment information in association with the merchant. In some instances, the payment service determines to send the message when a set number of the values each exceed their respective threshold values. In some examples, the set number of values can include at least one of the values. For instance, the payment service can determine to send the message when at least one of the total number of transactions between the merchant and the customer exceeds the transaction threshold, the total cost of transactions between the merchant and the customer exceeds the transaction threshold, or the frequency in which transactions occur between the merchant and the customer exceeds the frequency threshold. Additionally, or alternatively, in some examples, the set number of values can include two or more values. For instance, the payment service can determine to send the message when two values, such as the total number of transactions and the total cost of transactions, each exceed their respective threshold value.

In some instances, values may also be weighted based on transaction activity associated with the customer and maintained by the payment service. For instance, based on the transaction activity or card on file status of the customer as associated with other merchants, the payment service may determine that a frequency and cost should be weighted more than the number of transactions in the event a customer typically makes one large purchase a few times a week at various merchants, or a transaction cost and number of transactions should be weighted more than the frequency in the event a customer infrequently purchases a number of high valued items with at least one other merchant, etc.

In some instances, however, the payment service may determine that a set number of values each do not exceed their respective threshold value. In response, the payment service may refrain from sending the message to the customer. Additionally, the payment service may continue monitoring transaction activity between the merchant and the customer by receiving transaction information from the POS device describing transactions between the merchant and the customer, analyzing the transaction information to determine the respective value associated with the at least one transaction characteristic, and determining whether the respective value exceeds the threshold value. Due to the volume and variety of customers a merchant interacts with on any given day, examples of the present invention provide technical improvements over previous point of sale devices in analyzing and determining when transaction activity associated with an individual customer warrants storage of payment information.

For instance, the payment service can receive additional transaction information from the POS device associated with the merchant. The additional transaction information can describe one or more additional transactions between the merchant and the customer. For instance, the additional transaction information for a respective transaction can indicate an identifier (e.g., name) of the customer, the payment information associated with the payment instrument used by the customer during the respective transaction, item(s) acquired by the customer during the respective transaction, a cost of the item(s) acquired by the customer during the respective transaction, a time, place and date of the respective transaction, and so forth. The payment service can then store, in the database, the additional transaction information in association with the profile of the customer.

While receiving the additional transaction information, payment service can continue to analyze the transaction information in order to determine a respective value associated with at least one transaction characteristic as indicated by the transaction information. In some instances, the payment service analyzes the transaction information each time the payment service receives transaction information for a respective transaction from the POS device. In some instances, the payment service analyzes the transaction information after receiving transaction information for a set number of transactions (e.g., two transactions, three transactions, etc.) between the merchant and the customer. Still, in some instances, the payment service analyzes the transaction information at given time intervals, such as every day, week month, or the like.

For example, and extending the example described above, the additional transaction information can describe a second transaction between the merchant and the customer. Based on receiving the additional transaction information, the payment service can analyze the transaction information that is associated with the customer (e.g., the transaction information above, as well as this additional transaction information). For instance, since the payment service is now analyzing transaction information for the two transactions, the payment service can determine that the total number of transactions is two, the total cost of the transactions is $120, and the frequency for transactions is two transactions per week. The payment service can then determine whether two transaction exceeds the transaction threshold, whether $120 transactions exceeds the cost threshold, and/or whether two transactions per week exceeds the frequency threshold.

As discussed above, in some instances, based on determining that a set number of values each exceed their respective threshold value, the payment service may send a message to the customer, via the contact information, requesting that the customer save the payment information in association with the merchant. For instance, the payment service can send the customer an email, via an email address of the customer, requesting that the customer save the payment information in association with the merchant. In response, the customer can use a device associated with the customer to view the message from the payment service. Additionally, the customer can use the device to send, to the payment service, a message requesting that the payment service store the payment information in association with the merchant.

The payment service can receive the message from the customer and, in response, store the payment information in association with the merchant. In some instances, storing the payment information in association with the merchant can include sending, to the POS device, the payment information associated with the payment instrument. In some instances, the payment service may first encrypt the payment information before sending the payment information to the POS device. In some instances, the POS device can store the payment information in association with an identity of the customer. The POS device can then use the payment information during subsequent transactions between the merchant and the customer to process the payment instrument. For instance, during a subsequent transaction with the customer, the POS device may send a request to process the payment instrument to the payment service, where the request includes the stored payment information.

Additionally, or alternatively, in some instances, storing the payment information in association with the merchant can include storing, in the database associated with the merchant, an indication that the customer provided consent for the merchant to use the payment information. In such instances, the payment service can send the POS device additional information associated with the payment instrument, which the POS device can use to charge the payment instrument of the customer. The additional information associated with the payment instrument can include an identity of the customer, a portion of the payment information, an expiration date of the payment instrument, a proxy number and/or other code that the payment service generates and associates with the payment instrument, or the like. The POS device can then use the additional information to charge the payment instrument during future transactions.

For instance, the POS device can receive the additional information associated with the payment instrument from the payment service. The POS device can then save the additional information in association with the identity of the customer. After storing the additional information, and during a future transaction, the POS device can send a request to process the payment instrument to the payment service, where the request includes some and/or all of the additional information. The payment service can receive the request from the POS device, determine that the merchant is authorized to charge the payment instrument using the stored payment information (based on the stored indication), retrieve the payment information stored in association with the profile, and then attempt to authenticate the payment instrument using the stored payment information.

In some instances, when conducting a transaction using the stored payment information, the payment service and/or the POS device may require additional input from the customer before authenticating the payment instrument. For instance, in some examples, the POS device may request that the customer input information associated with the customer, such as a billing zip code, phone number, or the like. In some examples, the POS device may request that the customer input additional information, such as a code and/or other type of password. In some instances, the POS device may not send the request to the payment service until receiving the additional input from the customer. For instance, the payment service may not send the request until the POS device receives the input from the customer and then determines that the input is valid (e.g., matches the information, code, and/or password saved locally). In some instances, the payment service may not attempt to authorize the payment instrument until receiving data associated with the additional input. For instance, the payment service may not attempt to authorize the payment information until determining that the input is valid (e.g., matches the information, code, and/or password saved locally).

In some instances, the payment service may perform a similar process for one or more other merchants and/or one or more other customers of a respective merchant. By doing so, the payment service may create a system where the payment service and POS devices of respective merchants can process transactions using stored payment information for customers, without requiring that a respective customer provide the payment instrument during a transaction. Such a system improves transaction processing, as the system can be more efficient and more secure. For instance, card readers are not required to read payment information from payment instrument, which can take time and consume computing resources. Additionally, in some instances, payment information is not sent/received between the payment service and the POS devices, which can create a more secure system.

Even though the techniques above describe the payment service sending the message to the customer, in some instances, the payment service may send, to the POS device, a message requesting that the customer store the payment information in association with the merchant. In some instances, the merchant device can receive the message and based on receiving the message, display the message to the merchant and/or the customer. The merchant and/or the customer can then utilize the merchant device to send a message back to the payment service that indicates that the customer wants to store the payment information in association with the merchant.

FIG. 1 illustrates an example system 100 for handling transactions among customers and merchants. More particularly, FIG. 1 provides a framework of a system 100 that provides improves electronic card on file transactions. In some instances, the system 100 analyzes transaction information associated with transactions between merchants and customers to enroll customers in a card on file program.

For instance, as shown in FIG. 1, the system 100 may include a customer 102, a customer device 104 associated with the customer 102, a merchant 106, one or more merchant device(s) 108 associated with the merchant 106, one or more network(s) 110, and one or more computing device(s) 112 associated with a service, such as a payment service. In various instances, the customer 102 may operate the customer device 104, which may include one or more processor(s) 114, memory 116, a display 118 and a network interface 120. The memory 116 may store a payment service interface 122 and a POS module 124. Similarly, the merchant(s) 106 may operate the merchant device(s) 108, which may include one or more processor(s) 126, memory 128, a card reader 130, a display 132 and a network interface 134. The memory 128 may store a payment service interface 136 and a POS module 138. The computing device(s) 112 may also include one or more processor(s) 140, memory 142 and a network interface 144. The memory 142 may store a user interaction module 146, a merchant interaction module 148, a payment module 150, an analysis 152, and a database 154.

In some instances, the customer 102 may operate the customer device 104 to perform various functions associated with the customer device 104. For example, the customer 102 may utilize the customer device 104, and particularly the payment service interface 122 thereof, to interact with the computing device(s) 112 via the network interface 120 to establish a user account with the payment service of the computing device(s) 112. In addition, customer 102 may utilize the POS module 124 of the customer device 104 to interface with the POS module 138 of the merchant device(s) 108, e.g. as part of a transaction using the payment service of the computing device(s) 112. For example, the customer device 104 may communicate via the network interface 120 with the merchant device(s) 108 and the network interface 134. As an example of such a payment operation, the POS module 138 of the merchant device(s) 108 may communicate with the POS module 124 of the customer device 104 to obtain information, such as payment information associated with a payment instrument, for processing a payment from the customer 102 to the merchant 106 using the payment service of the computing device(s) 112.

In some instances, the customer device 104 may be any type of device that is capable of interacting with the merchant device(s) 108 and/or the computing device(s) 112. For instance, the customer device 104 may include a personal computer, a laptop computer, a cellular telephone, a PDA, a tablet device, or any other device. The customer device 104 shown in FIG. 1 is only one example of a customer device 104 and is not intended to suggest any limitation as to the scope of use or functionality of any customer device 104 utilized to perform the processes and/or procedures described herein. For example, the customer device 104 may include various other applications or modules, such as a module for a user dashboard to enable the user to control information in a user's profile, set user preferences, and so forth.

The processor(s) 114 of the customer device 104 may execute one or more modules and/or processes to cause the customer device 104 to perform a variety of functions, as set forth above and explained in further detail in the following disclosure. In some instances, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the customer device 104, the memory 116 may include volatile memory (such as RAM), non-volatile memory (such as ROM, flash memory, miniature hard drive, memory card, or the like), or some combination thereof.

In various instances, the customer device 104 may also have input device(s) such as a keyboard, a mouse, a pen, a voice input device, a touch input device, etc. The customer device 104 may also include the display 118 and other output device(s), such as speakers, a printer, etc. The customer 102 may utilize the foregoing features to interact with the customer device 104, merchant device(s) 108 or the computing device(s) 112 via the network(s) 110. More particularly, the display 118 of the customer device 104 may include any type of display 118 known in the art that is configured to present (e.g., display) information to the customer 102.

In various instances, the merchant 106 may be any individual, entity, or machine that offers products, services or the like according to the examples herein. Moreover, the merchant 106 may be associated with one or more merchant device(s) 108, which may be the same as, similar to, or different from the customer device 104. The merchant device(s) 108 may include any number of components such as the one or more processor(s) 126, the memory 128, the card reader 130, the display 132 and/or network interface 134. The merchant 106 may utilize the merchant device(s) 108 to interact with the customer device 104 and/or computing device(s) 112 in any manner. For instance, the merchant device(s) 108 may be used to access an interface associated with the computing device(s) 112 (e.g. the payment service interface 136). Continuing the above example, a merchant device(s) 108 may utilize information obtained from interacting with the POS module 124 of the customer device 104 to execute the payment from the customer 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 156 and/or bank(s) computing device(s) 158 to execute payments from the customer 102 to the merchant 106.

While the customer device 104 and merchant device(s) 108 are shown as including different modules, this is merely for ease of illustration and not intended as limiting. In various instances, the customer device 104 and merchant device(s) 108 may be identical, similar or distinct. Moreover, the modules shown and described for the customer device 104 and merchant device(s) 108 may be implemented as more modules or as fewer modules and functions described for the modules may be redistributed depending on the details of the instance. Further, in some instances, the customer device 104 and/or merchant device(s) 108 may vary from device to device. In general, the customer device 104 and the merchant device(s) 108 can each be any appropriate device operable to send and receive requests, messages, or other types of information over the one or more networks 110 or directly to each other.

In some instances, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more network(s) 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the customer device 104, the merchant device(s) 108, and the computing device(s) 112 may communicatively couple to the network(s) 110 in any manner, such as by a wired or wireless connection. The network(s) 110 may also facilitate communication between the customer device 104, the merchant device(s) 108, and the computing device(s) 112. In turn, the network interfaces 120, 134 and 144 of the customer device 104, the merchant device(s) 108, and the computing device(s) 112 may be any network interface hardware components that may allow customer device 104, the merchant device(s) 108, and the computing device(s) 112 communicate over the network(s) 110. For example, in a particular instance, the network interfaces 120 and 134 of the customer device 104 and merchant device(s) 108, respectively, may include near field communication capabilities for performing the communications there between involved in POS operations.

In addition, and as mentioned previously, the computing device(s) 112 may include the one or more processor(s) 140, the memory 142, and network interface 144. The computing device(s) 112 may also include additional components not listed above that may perform any function associated with the computing device(s) 112. In various instances, the computing device(s) 112 may be any type of computing device, such as a network-accessible server, and may be one of multiple servers included in a server cluster or server farm. In other instances, the processor(s) 140 and the memory 142 of the computing device(s) 112 may be the same as, similar to, or different from the processor(s) 114 and the memory 116, respectively, of the customer device 104. As discussed above, the memory 142 may store the user interaction module 146, the merchant interaction module 148, the payment module 150, the analysis module 152, and the database 154. The database 154 may store various information including user account information 160, merchant information 162, user profile(s) 164, transaction information 166, and contact information 168. In some instance, at least one of the database(s) 154 may be associated with the merchant 106. For instance, the computer device(s) 112 may store one or more database(s) 154 where each database 154 is associated with a respective merchant.

The user interaction module 146 and merchant interaction module 148 operate to interface with the customer device 104 and merchant device(s) 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the customer 102 and merchant 106, respectively. In addition, the payment module 150 may utilize information from the database 154, such as the user account information 160 and merchant information 162 to provide handling of payments between the merchant 106 and the customer 102. In some instances, user account information 160 may include information regarding electronic payment accounts of the customer 102, such as payment information associated with one or more payment instruments.

As mentioned above, the payment module 150 may handle payments between the merchant 106 and the customer 102. When paying for a transaction, the customer 102 can provide the amount of payment that is due to a merchant 106 using cash, check, a payment card, NFC, or by electronic payment through a payment service of the computing device(s) 112. The merchant 106 can interact with the merchant device(s) 108 to process the transaction. In some examples, the service of the computing devise(s) 112 may handle some payments while other payments may at least at times be handled by point of sale (POS) transactions. In such cases, the point of sale may be the place where the customer 102 with customer device 104 interacts with the merchant 106 with merchant device(s) 108 and executes a transaction (e.g. purchases items from a street vendor merchant or a restaurant merchant). During POS transactions, the merchant device(s) 108 can determine and send data describing the transactions, including, for example, services provided, item(s) being purchased, the amount of the services or item(s), buyer information, and so forth.

In some instances, the computing device(s) 112 enables card-less payments, i.e., electronic payments, for transactions between the merchant 106 and the customer 102 based on interaction of the customer 102 with the customer device 104 and interaction of the merchant 106 with the merchant device(s) 108. Accordingly, in some examples, a card-less payment transaction may include a transaction conducted between the merchant 106 and the customer 102 at a POS location during which an electronic payment account of the customer 102 is charged without the customer 102 having to physically present a payment instrument to the merchant 106 at the POS location. Consequently, the merchant 106 need not receive any details about the financial account of the customer 102 for the transaction to be processed. As one example, the electronic payment may be charged to a credit card issuer or credit card number that the customer 102 provided when signing up with the service of the computing device(s) 112 for an electronic payment account. As another example, the customer 102 may request that payment information associated with one or more payment instruments be stored on the computing device(s) 112 and/or the merchant device(s) 108. Other variations will also be apparent to those of skill in the art having the benefit of the disclosure herein.

In some instances, before conducting an electronic payment transaction, the customer 102 can creates a user account with the service of the computing device(s) 112. The customer 102 can create the user account, for example, by interacting with an application of the customer device 104 that is configured to perform electronic payment transactions and that may execute on the customer device 104 (e.g. the payment service interface 122). When creating an electronic payment account with the service of the computing device(s) 112, the customer 102 may provide an image including the face of the user, data describing a financial account of the customer 102 (e.g., payment information, such as a credit card number, expiration date), and a billing address. This information can be securely stored by the computing device(s) 112, for example, in the user account information 160 in the database 154. Further, a profile 164 may be created for the customer 102, which may be associated with transaction information 166 and contact information 168 for the customer 102.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from the customer 102 will be deposited. This merchant information 162 can be securely stored by the service, for example, in the database 154 along with the user account information 160. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between the merchant 106 and the customer 102, for example, through data communicated between the customer device 104 and the merchant device(s) 108. Generally, when the merchant 106 and the customer 102 enter into an electronic payment transaction, the transaction is processed by electronically transferring funds from a financial account associated with the customer 102 account to a financial account associated with the merchant account. Alternatively, the customer 102 may have a balance of funds maintained by the computing device(s) 112 as part of the user account which may be used in transactions.

The computing device(s) 112 can also be configured to communicate with one or more card payment network computing devices(s) 156 of a card payment network (e.g., MasterCard®, VISA®) over the one or more networks 110 to conduct financial transactions electronically. The computing device(s) 112 can also communicate with one or more bank computing devices 158 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 156 of a card payment network and the bank computing devices 158 when processing transactions for payment instruments that do not involve the payment service of the computing device(s) 112.

In some instances, the computing device(s) 112 monitor transaction activity between the merchant 106 and the customer 102 in order to improve electronic card on file transactions. For instance, as discussed above, the computing device(s) 112 can receive transaction information 166 from the merchant device(s) 108. In some instances, the computing device(s) 112 receive transaction information 166 for a respective transaction each time the merchant 106 conducts a transaction with the customer 102. For instance, and as illustrated in FIG. 1, the customer 102 may engage transactions with the merchant 106 to obtain item(s) 170. During each transaction, the customer 102 may provide the payment instrument 172 to the merchant 106, along with requests for item(s) 170 offered by the merchant 106. The merchant 106 may use the merchant device(s) 108 to process the respective transaction with the customer 102.

For each transaction, the computing device(s) 112 can receive transaction information 166 from the merchant device(s) 108. As discussed above, the transaction information 166 for a respective transaction can indicate an identifier (e.g., name) of the customer 102, the payment information associated with the payment instrument 172 used by the customer 102 during the respective transaction, item(s) 170 acquired by the customer 102 during the respective transaction, a cost of the item(s) 170 acquired by the customer 102 during the respective transaction, a time, place and date of the respective transaction, and so forth.

In addition to the transaction information 166, the computing device(s) 112 can receive contact information 168 associated with the customer 102. The contact information can include an email address, telephone number, home address, fax number, or any other type of contact information that can be used to contact the customer 102. In some instances, as shown in FIG. 1, the computing device(s) 112 can receive the contact information 168 from the merchant device(s) 108. For instance, the customer 102 may provide the contact information 168 to the merchant 106. The merchant 106 can then input the contact information 168 into the merchant device(s) 108 and cause the merchant device(s) 108 to send the contact information 168 to the computing device(s) 112.

The computing device(s) 112 can associated the transaction information 166 and the contact information 168 with an identity of the customer 102. For instance, the computing device(s) 112 can store, in the database(s) 154, the transaction information 166 and the contact information 168 in association with a profile 164 of the customer 102. In some instances, the computing device(s) 112 store transaction information 166 in association with the profile 164 each time the computing device(s) 112 receive transaction information 166 for one or more transactions from the merchant device(s) 108. For instance, the computing device(s) 112 can store transaction information 166 for a respective transaction each time the computing device(s) 112 receive a request to process the payment instrument 172 for a cost of a transaction between the merchant 106 and the customer 102.

The computing device(s) 112 can further analyze the transaction information 166 to determine whether to send a message requesting that the customer 102 store the payment information in association with the merchant 106. For instance, the analysis module 152 may function to determine one or more values associated with one or more transaction characteristics indicated by the transaction information 166. A transaction characteristic can include a total number of transactions, a total cost of transactions, a frequency of transactions, or the like. As such, the when analyzing the transaction information 166, the analysis module 152 can determine at least one of: (1) a total number of transactions between the merchant 106 and the customer 102, (2) a total cost of transactions between the merchant 106 and the customer 102, or (3) a frequency in which transactions occur between the merchant 106 and the customer 102. In some instances, the analysis module 152 analyzes the transaction information 166 using one or more algorithms that determine the value associated with the each of the respective transaction characteristics.

The analysis module 152 further functions to determine whether one or more of the values exceeds a respective threshold value associated with each of the transaction characteristics. For instance, the analysis module 152 can utilize one or more algorithms to determine whether: (1) the total number of transactions between the merchant 106 and the customer 102 exceeds a transaction threshold (e.g., one transaction, two transaction, three transactions, etc.), (2) the total cost of the transactions between the merchant 106 and the customer 102 exceeds a cost threshold (e.g., $100, $1,000, $10,000, etc.), or (3) the frequency in which transactions occur between the merchant 106 and the customer 102 exceeds a frequency threshold (e.g., one transaction a week, three transactions a month, etc.).

In some instances, the analysis module 152 may use a common threshold for the values when analyzing transaction information for merchants. For instance, the analysis module 152 may use a first threshold value for the total number of transactions for all merchants, a second threshold value for the total cost of transactions for all merchants, and a third threshold value for the frequency in which transactions occur for all merchant. Additionally, or alternatively, in some instances, the analysis module 152 may use varying thresholds based on one or more factors, such as a type of business that a respective merchant performs, a size of the respective merchant (e.g., annual sales, number of employees, etc.), or the like. For instance, the analysis module 152 may use a first threshold value for the total number of transactions when the merchant is a coffee shop, and a second threshold value for the total number of transactions when the merchant is a clothing store.

The analysis module 152 further functions to determine whether to send the customer 102 a message, via the contact information 168, requesting that the customer 102 save the payment information associated with the payment instrument 172 with the merchant 106. In some instances, the analysis module 152 determines to send the message when a set number of the values each exceed their respective threshold value. In some instances, the set number of values can include at least one of the values. For instance, the analysis module 152 can determine to send the message when at least one of the total number of transactions between the merchant 106 and the customer 102 exceeds the transaction threshold, the total cost of transactions between the merchant 106 and the customer 102 exceeds the transaction threshold, or the frequency in which transactions occur between the merchant 106 and the customer 102 exceeds the frequency threshold. Additionally, or alternatively, in some instances, the set number of values can include two or more values. For instance, the analysis module 152 can determine to send the message when two values, such as the total number of transactions and the total cost of transactions, each exceed their respective threshold value.

In some instances, however, the analysis module 152 may determine that the set number of the values do not exceed their respective threshold value. In response, the computing device(s) 112 may refrain from sending the message to the customer 102. Additionally, the computing device(s) 112 may continue monitoring transaction activity between the merchant 106 and the customer 102 by receiving transaction information 166 from the merchant device(s) 108 describing additional transactions between the merchant 106 and the customer 102, and then analyzing the transaction information 166 using the analysis module 152 as described above.

For instance, the computing device(s) 112 can receive additional transaction information from the merchant device(s) 108 associated with the merchant 106. The additional transaction information can describe one or more additional transactions between the merchant 106 and the customer 102. For instance, the additional transaction information for a respective transaction can indicate an identifier (e.g., name) of the customer 102, the payment information associated with the payment instrument 172 used by the customer 102 during the respective transaction, item(s) 170 acquired by the customer 102 during the respective transaction, a cost of the item(s) 170 acquired by the customer 102 during the respective transaction, a time, place and date of the respective transaction, and so forth. The computing device(s) 112 can then store, in the database 154, the additional transaction information 166 in association with the profile 164 of the customer 102.

While receiving the additional transaction information 166, the analysis module 152 can continue to analyze the transaction information 166 in order to determine the one or more values associated with the one or more transaction characteristics. In some instances, the analysis module 152 analyzes the transaction information 166 each time the computing device(s) 112 receives transaction information 166 for a respective transaction from the merchant device(s)

108. For instance, the analysis module 152 can analyze the transaction information 166 each time the computing device(s) 112 receive a request from the merchant device(s) 108 to process the payment instrument 172 for a cost of a transaction between the merchant 106 and the customer 102. In some instances, the analysis module 152 analyzes the transaction information 166 after receiving transaction information 166 for a set number of transactions (e.g., two transactions, three transactions, etc.) between the merchant 106 and the customer 102. Still, in some instances, the analysis module 152 analyzes the transaction information 166 at given time intervals, such as every day, week month, or the like.

For example, the additional transaction 166 information can describe a transaction between the merchant 106 and the customer 102 that occurs subsequently to the first analysis described above. Based on receiving the additional transaction information, the analysis module 152 can analyze the transaction information 166 that is associated with the customer 102, which now includes the transaction information 166 analyzed above as well as the new additional transaction information 166. Based on the analysis, the analysis module 152 determines whether one or more values associated with one or more transaction characteristics each exceed their respective threshold value. The analysis module 152 can then again determine whether to send the customer 102 the message, via the contact information 168, requesting that the customer 102 save the payment information associated with the payment instrument 172 with the merchant 106.

For instance, as discussed above, the analysis module 152 determines to send the message when a set number of values each exceed their respective threshold value. As such, in some instances, the analysis module 152 can determine to send the message when at least one of the new values exceeds its respective threshold value. In some instances, the analysis module 152 can determine to send the message when two or more of the new values each exceed their respective threshold value. In either instance, the analysis module 152 will determine to send the message when the set number of values each exceed their respective values, or will continue monitoring transaction activity between the merchant 106 and the customer 102 until the set number of values each exceed their respective values.

As described herein, memory, such as memory 116, memory 128, and memory 142, may be an example of tangible non-transitory computer storage media and may include volatile and nonvolatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, the electronic devices, such as the customer device 104, the merchant device(s) 108, and the computing device(s) 112, may access external storage, such as RAID storage systems, storage arrays, network attached storage, storage area networks, cloud storage, or any other medium that can be used to store information and that can be accessed by the respective processor(s) of the electronic devices either directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Figure 2:
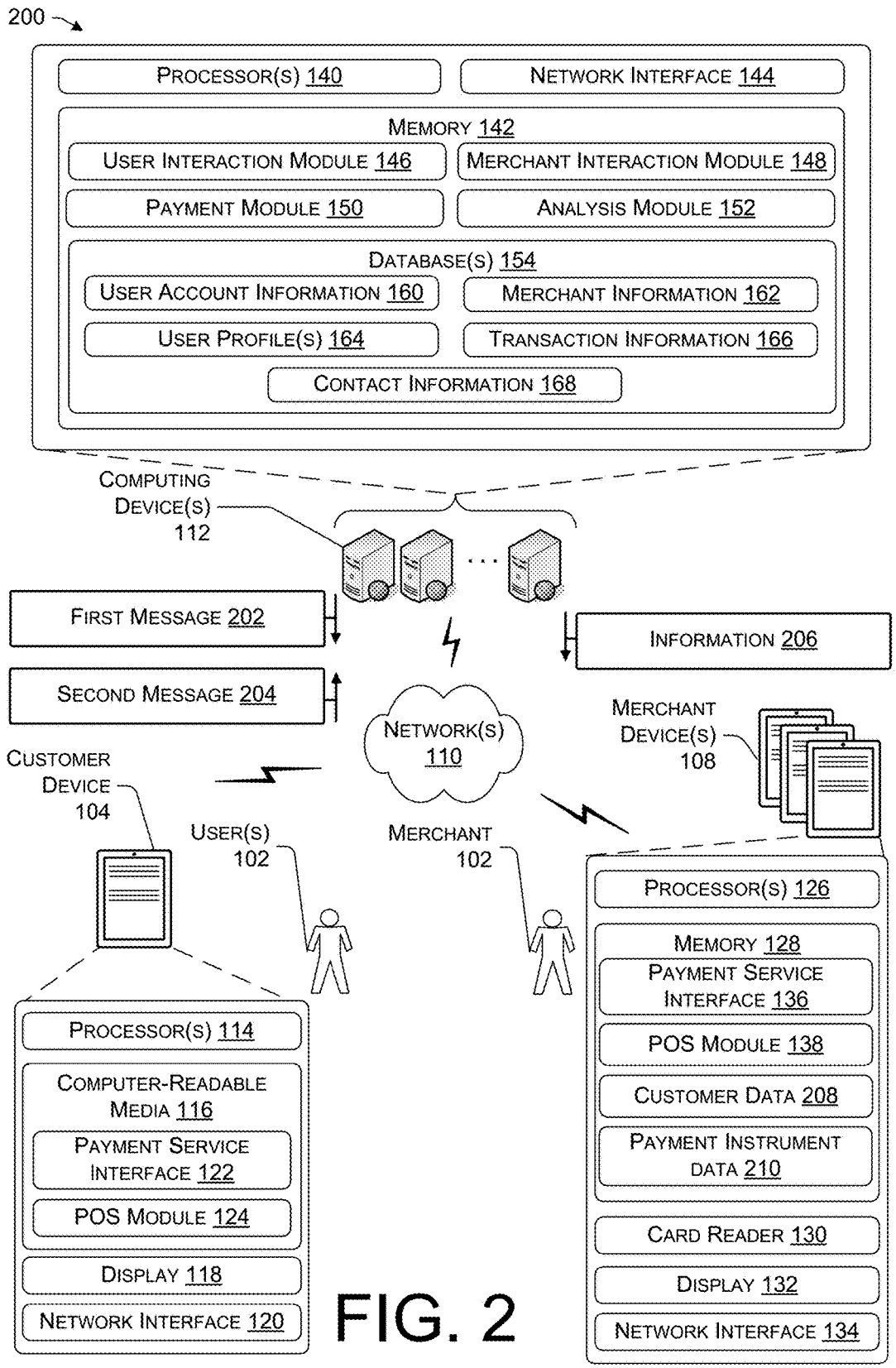
FIG. 2 is an example system that includes the payment service sending, to the customer, the message requesting that the customer store the payment information with the merchant. In this system, the payment service further receives, from a device associated with the customer, a message requesting that the payment service store the payment information with the merchant. In response, the payment service sends the merchant device(s) information associated with the payment instrument.

FIG. 2 illustrates an example system 200 for storing the payment information in association with the merchant 106 based on the analysis of the transaction activity. For instance, based on determining that a set number of the values each exceed their respective threshold value, as described in FIG. 1, the analysis module 152 can determine to send the customer 192 a message requesting that the customer 102 save the payment information in association with the merchant 106. Based on the determination, the computing device(s) 112 can send the customer 102 the message via the contact information 168, which is represented by the first message 202 in FIG. 2.

In some instances, the contact information 168 for the customer 102 can include an email address. In such instances, the computing device(s) 112 can generate and send the customer 102 an email, via the email address, requesting that the customer 102 store the payment information in association with the merchant 106. In some instances, the contact information may include a phone number of the customer 102. In such instances, the computing device(s) 112 can send the customer 102 an electronic message, via the phone number, that requests the customer 102 to store the payment information in association with the merchant 106.

The customer 102 can receive the message via the customer device 104. The customer 102 can then send the computing device(s) 112 a message that requests to store the payment information in association with the merchant 106, which is represented the second message 204. For example, if the first message from the computing device(s) 112 includes an email, the customer 102 can use the customer device 104 to send an email back to the computing device(s) 112 that requests to store the payment information in association with the merchant 106. For another example, if the first message from the computing device(s) 112 includes an electronic message sent via the phone number, the customer 102 can use the customer device 104 to send an electronic message back to the computing device(s) 112 that requests to store the payment information in association with the merchant 106.

The computing device(s) 112 can receive the message from the customer 102 and, in response, analyze the message to determine that the message indicates that the customer 102 wants to store the payment information in association with the merchant 106. Based on the determination, the computing device(s) 112 can then store the payment information in association with the merchant 106. In some instances, storing the payment information in association with the merchant 106 can include sending, to the merchant device(s) 108, the payment information associated with the payment instrument, which may be represented by the sending of the information 206. In such instances, the merchant device(s) 108 can receive the payment information from the computing device(s) 112, and then store the payment information in association with an identity of the customer 102. For instance, in the example of FIG. 2, the customer data 208, which the merchant device(s) 108 can receive from the computing device(s) 112, can include at least an identity of the customer 102, contact information for the customer 102, or the like. The payment instrument data 210 can include the payment information associated with the payment instrument 172.

Additionally, or alternatively, to sending the payment information, in some instances, storing the payment information in association with the merchant 106 can include storing, in the database 154, an indication that the customer 102 provided consent for the merchant 106 to use the payment information. In such instances, the computing device(s) 112 can further send the merchant device(s) 108 additional information associated with the payment instrument, which the merchant device(s) 108 can use to charge the payment instrument of the customer, which may also be represented by the sending of the information 206. For instance, the computing device(s) 112 can send the merchant device(s) 108 the customer data 208 of the customer 102 along with information associated with the payment instrument, such as the last four digits of the account number, the expiration data, and/or the like. In response, the merchant device(s) 108 can save the information in association with the identity of the customer 102.

Figure 3:
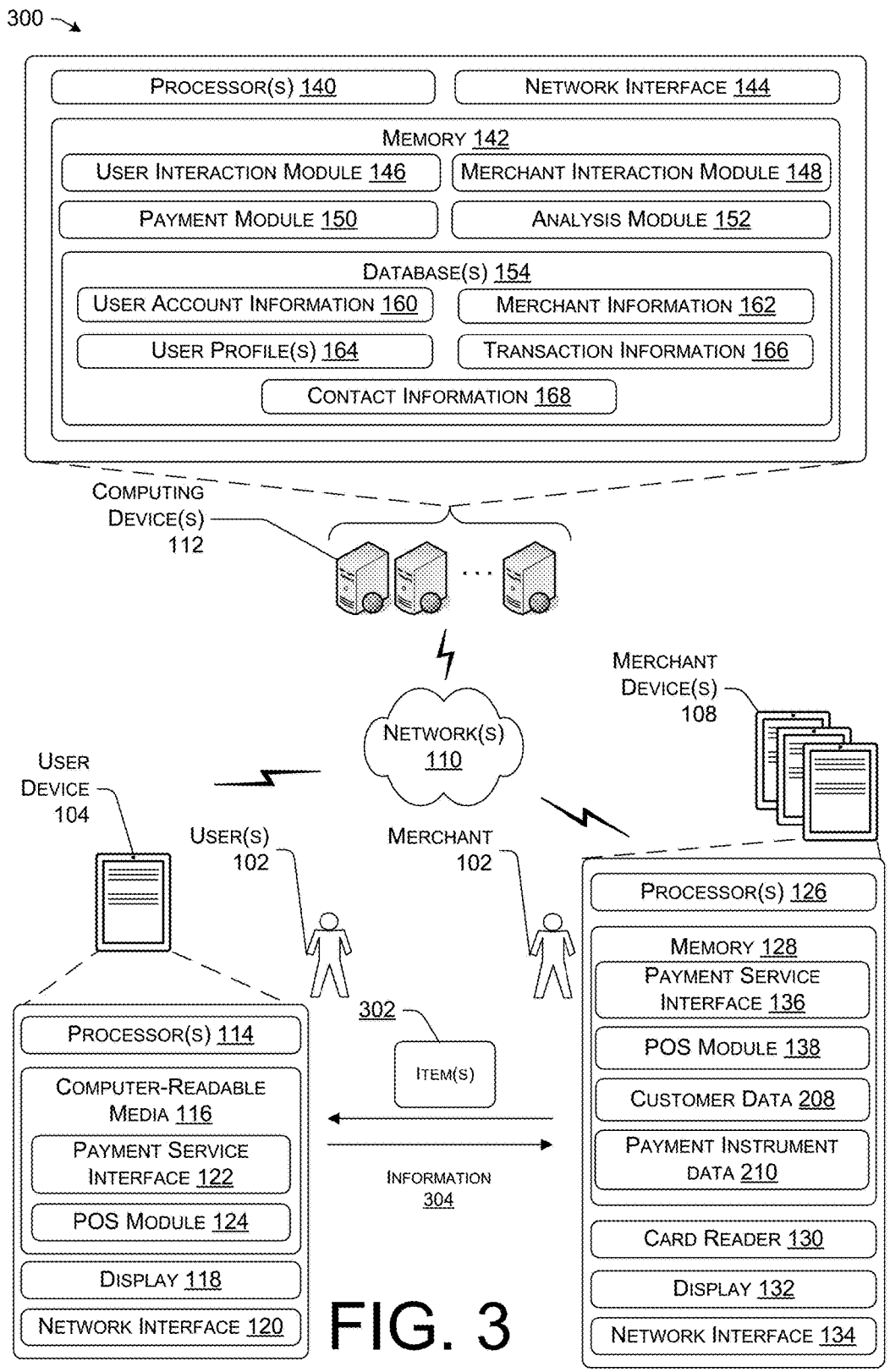
FIG. 3 is an example system that includes the merchant conducting a transaction with the customer for item(s). In this system, rather than providing the merchant with the payment instrument, the customer provides the merchant with information during the transaction. The merchant device(s) then send the payment service a request to process the transaction, where the request includes at least a portion of the information associated with the payment instrument. Based on receiving the request, the payment service then attempts to authorize the payment instrument for the transaction between the merchant and the customer.

FIG. 3 illustrates an example system 300 for conducting a subsequent transaction between the merchant 106 and the customer 102 using the card on file. For instance, after storing the payment information in association with the merchant 106 from FIG. 2, the merchant 106 and the customer 102 may conduct a subsequent transaction for the sale of item(s) 302. However, during the subsequent transaction, in some instances, the customer 102 may not provide the merchant 106 with the payment instrument 172. Rather, the merchant device(s) 108 may process the transaction using the payment instrument data 210.

For example, when the payment instrument data 210 include the payment information, the merchant device(s) 108 can send the computing device(s) 112 a request to process the payment instrument 172 for a cost of the subsequent transaction, where the request includes the stored payment information associated with the payment instrument 172. In response, the computing device(s) 112 can receive the request from the merchant device(s) 108. The computing device(s) 112 can then use the payment information to attempt to authorize the payment instrument 172 for the cost of the subsequent transaction. Additionally, the computing device(s) 112 can send the merchant device(s) 108 a message indicating whether the payment instrument 172 was authorized or not authorized for the subsequent transaction.

For another example, when the payment instrument data 210 includes information associated with the payment instrument (e.g., a portion of the entire payment information), the merchant device(s) 108 can send the computing device(s) a request to process the payment instrument for a cost of the subsequent transaction, where the request includes an identifier (e.g., name, account information, etc.) for the customer 102 and/or the information. In response, the computing device(s) 112 can receive the request from the merchant device(s) 108 and use the identifier of the customer 102 and/or the information to identify the profile 164 of the customer 102. The computing device(s) 112 can then determine that the merchant 106 is authorized to conduct transactions with the customer 102 using the card on file. Based on the determination, the computing device(s) 112 can attempt to authorize the payment instrument 172 for the cost of the subsequent transaction using the payment information that is stored in association with the profile 164 of the customer 102. Additionally, the computing device(s) 112 can send the merchant device(s) 108 a message indicating whether the payment instrument 172 was authorized or not authorized for the subsequent transaction.

Also illustrated in FIG. 3, the customer 102 may provide the merchant 106 with information 304 during the subsequent transaction. For instance, in some examples, the merchant device(s) 108 may not send the request to the computing device(s) 112 without verifying an identity of the customer 102. As such, the customer 102 may provide the merchant 106 with information 304 that identifies the customer 102, or the customer 102 may input the information 304 directly into the merchant device(s) 108. The information 304 can include any information that the merchant device(s) 108 can use to verify that a customer conducting the subsequent transaction corresponds to the customer 102 associated with the customer data 208 and/or the payment instrument data 210. For instance, the information 304 may include the name of the customer 102, the birthdate of the customer 102, an address for the customer 102 (e.g., zip code), an account name for the customer 102, a password and/or other code associated with the customer 102, or the like. The merchant device(s) 108 can receive the information 304 from the customer 102, verify the information 304 using the customer data 208, and then send the request to the computing device(s) 112 in response.

In some instances, in addition to, or alternatively from, the merchant device(s) 108 verifying the customer 102 using the information 304, the computing device(s) 112 may verify the customer 102 using the information 304 before attempting to authorize the payment instrument 172. For instance, the merchant device(s) 108 may send data associated with the information 304 to the computing device(s) 112. In some instances, the merchant device(s) 108 send the data along with the request to authorize the payment instrument 172. The computing device(s) 112 can then receive the data from the merchant device(s) 108, and verify the information 304 using the user account information 160 for the customer 102. Based on verifying the information 304, the computing device(s) 112 can then attempt to authorize the payment instrument 172 for the merchant 106.

Figure 4:
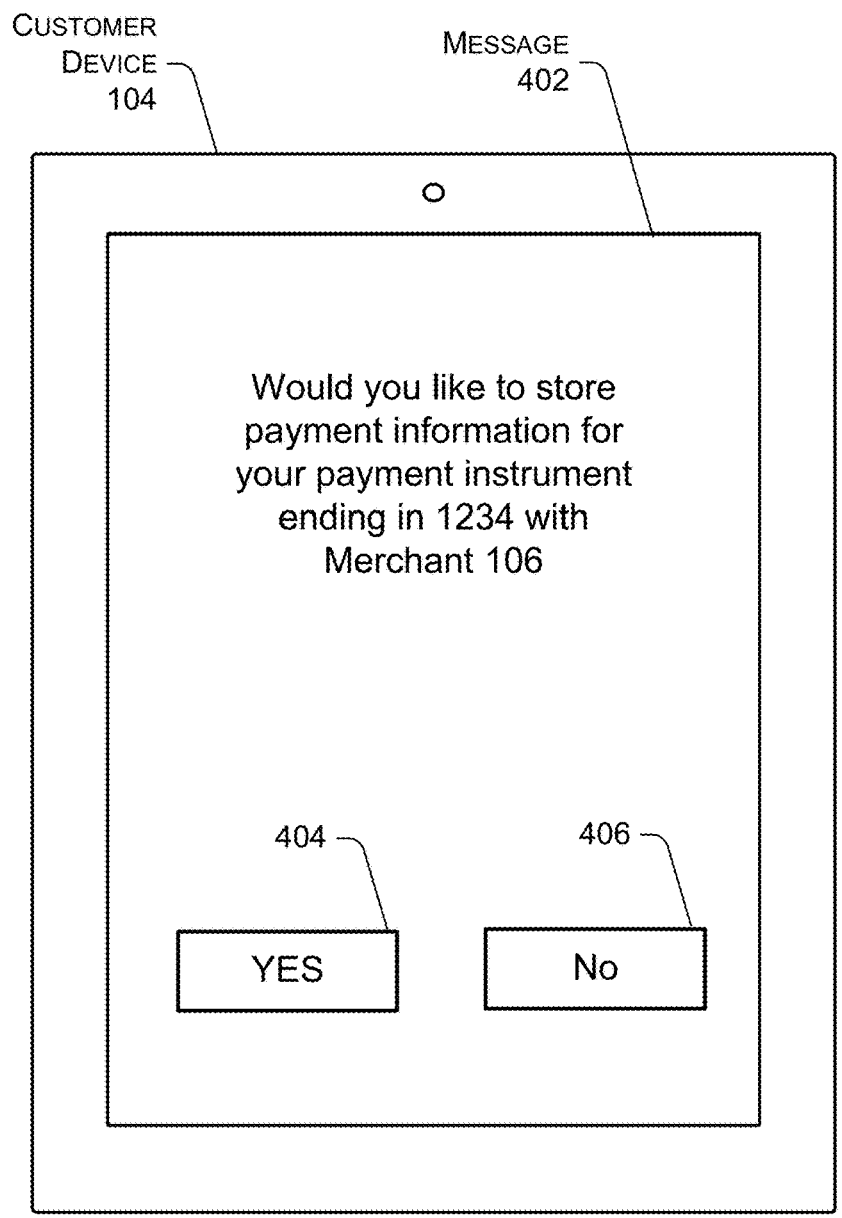
FIG. 4 illustrates an example of a message that the payment service may send to the customer. As shown, the message requests that customer store the payment information with the merchant.

FIG. 4 illustrates an example of a message 402 that the computing device(s) 112 may send to the customer 102. As shown, the message 402 requests that the customer 102 store the payment information associated with the payment instrument 172 (indicated by the last four digits "1234" of the payment information) with the merchant 106. The customer 102 can then use the customer device 104 to select yes 404 or no 406. In some instances, selecting yes 404 will cause the customer device 104 to send the message back to the computing device(s) 112 that requests for the payment information to be stored in the merchant 106. Additionally, selecting no 406 may cause the customer device 104 to send a message back to the computing device(s) 112 that indicates that the customer 102 does not want to store the payment information in association with the merchant 106.

Figure 5:
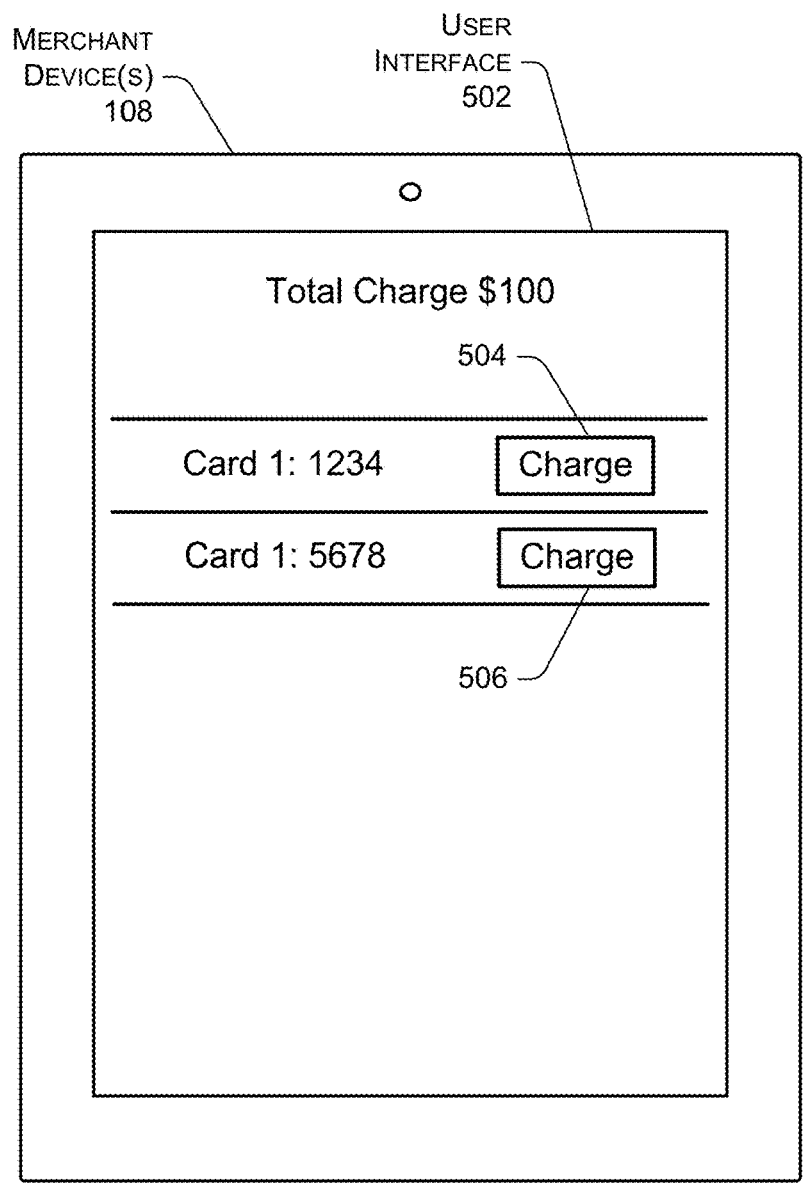
FIG. 5 illustrates an example of a user interface that a merchant device may provide to the customer when conducting a transaction using a card on file. In the example, the user interface includes two selectable elements, where each selectable element is associated with a respective payment instrument.
Figure 6A:
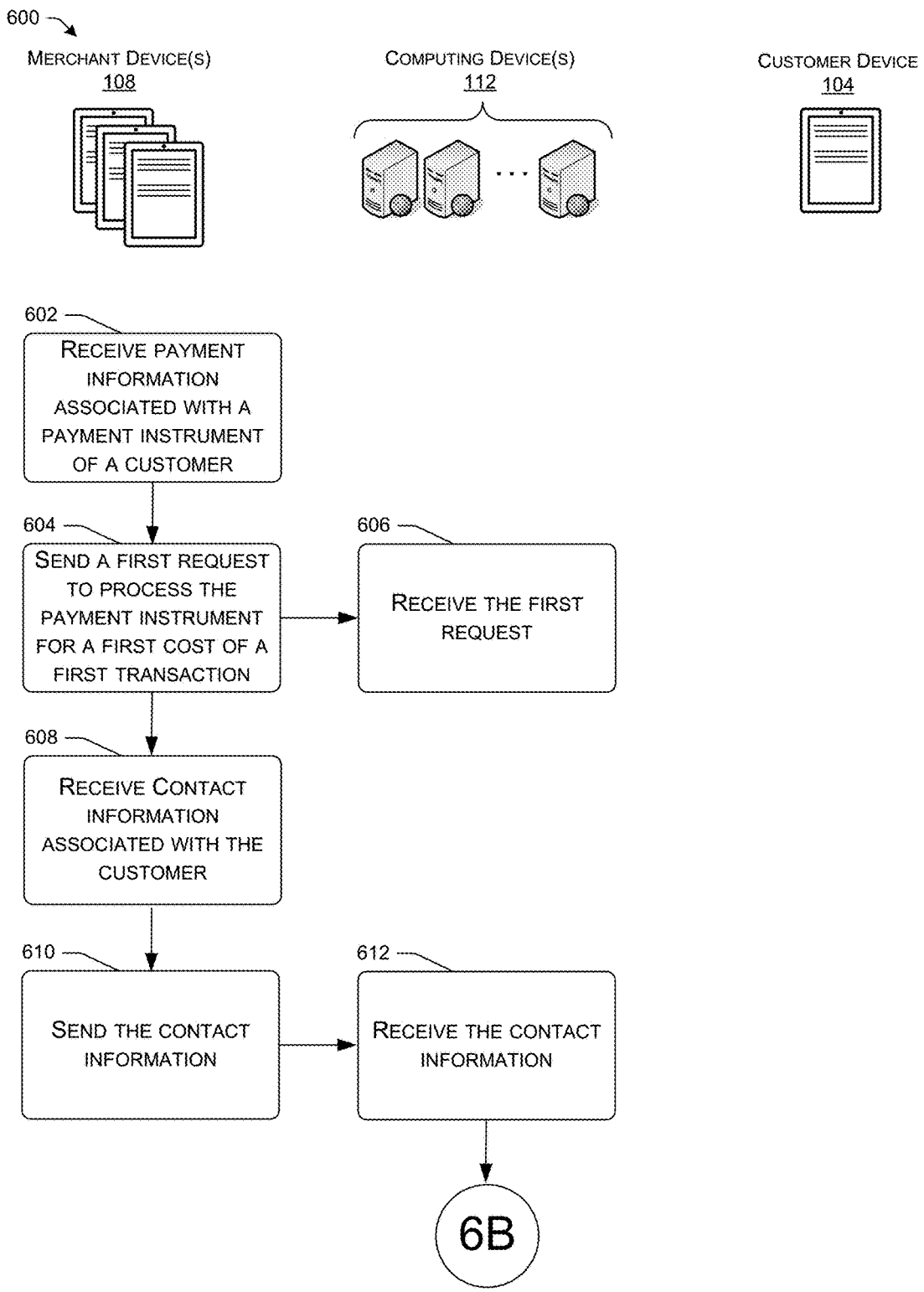
FIGS. 6A-6E illustrate a flow diagram of an example process for improving card on file transactions. The process includes a payment service that analyzes transaction information associated with at least one transaction between a merchant and a customer, and then sends a device of the customer a message requesting to store payment information with the merchant. Additionally, the payment service receives, from the device, a message indicating that the customer would like to store the payment information with the merchant, and then sends information associated with the payment instrument to merchant device(s).
Figure 6B:
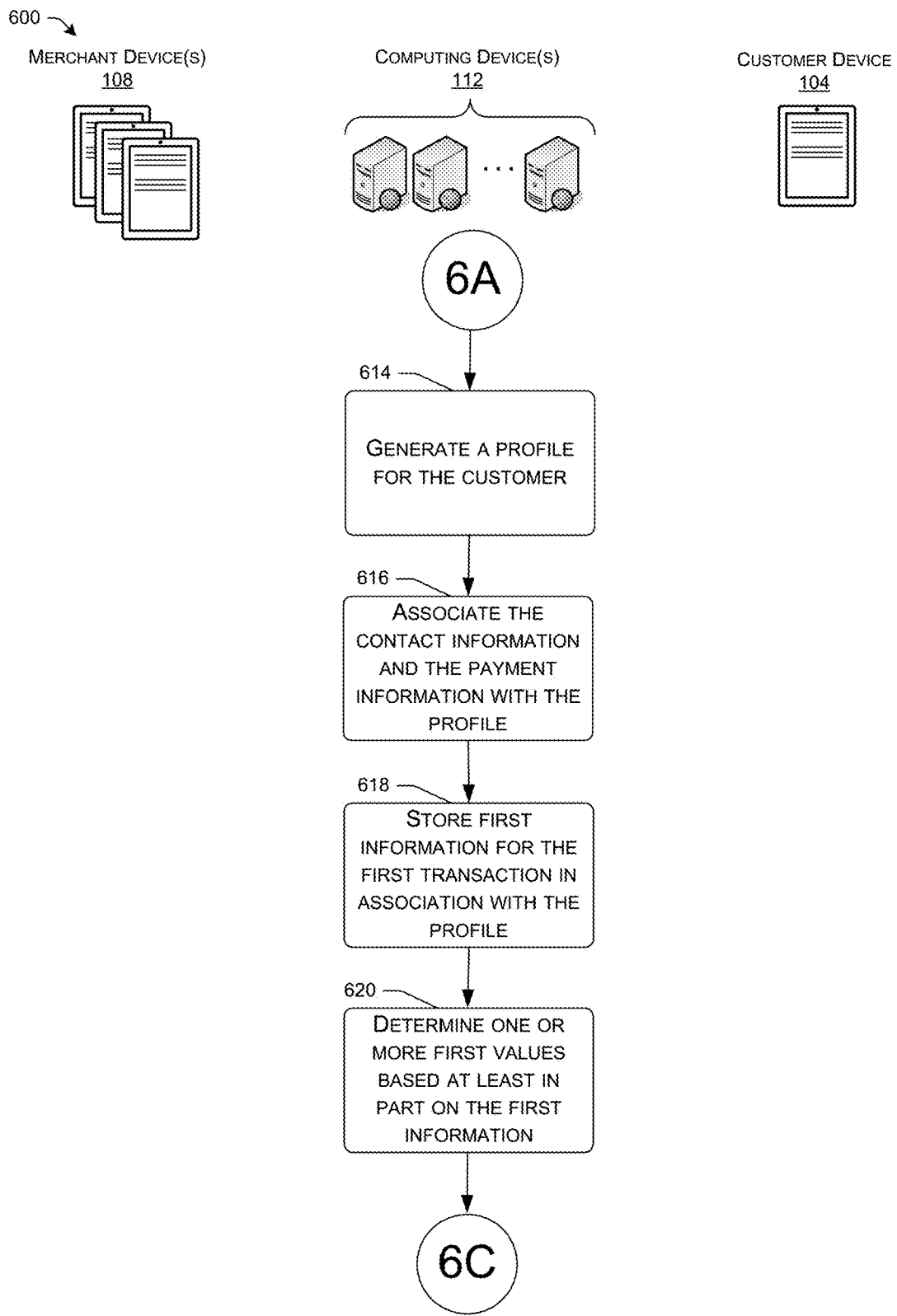
Figure 6C:
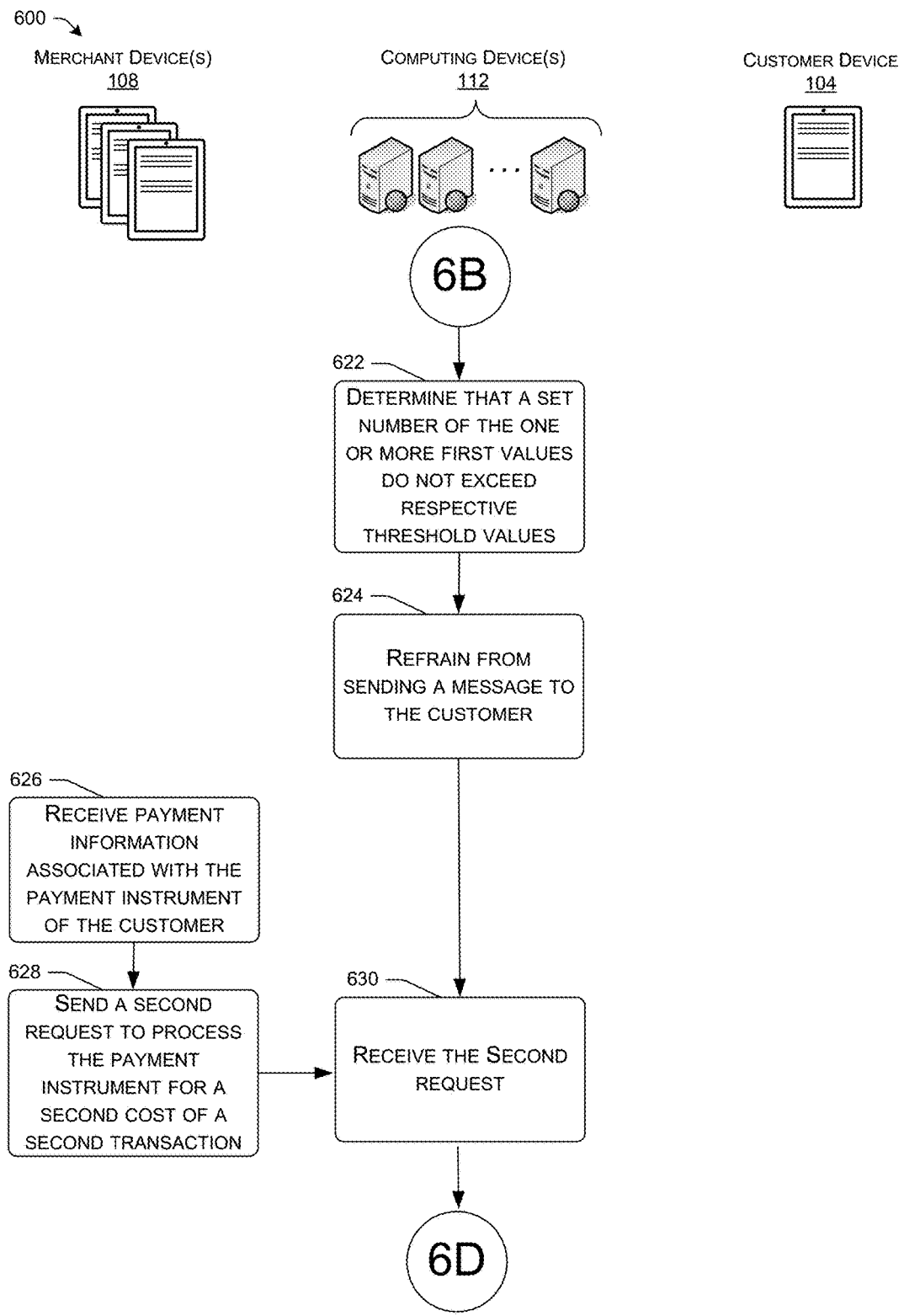
Figure 6D:
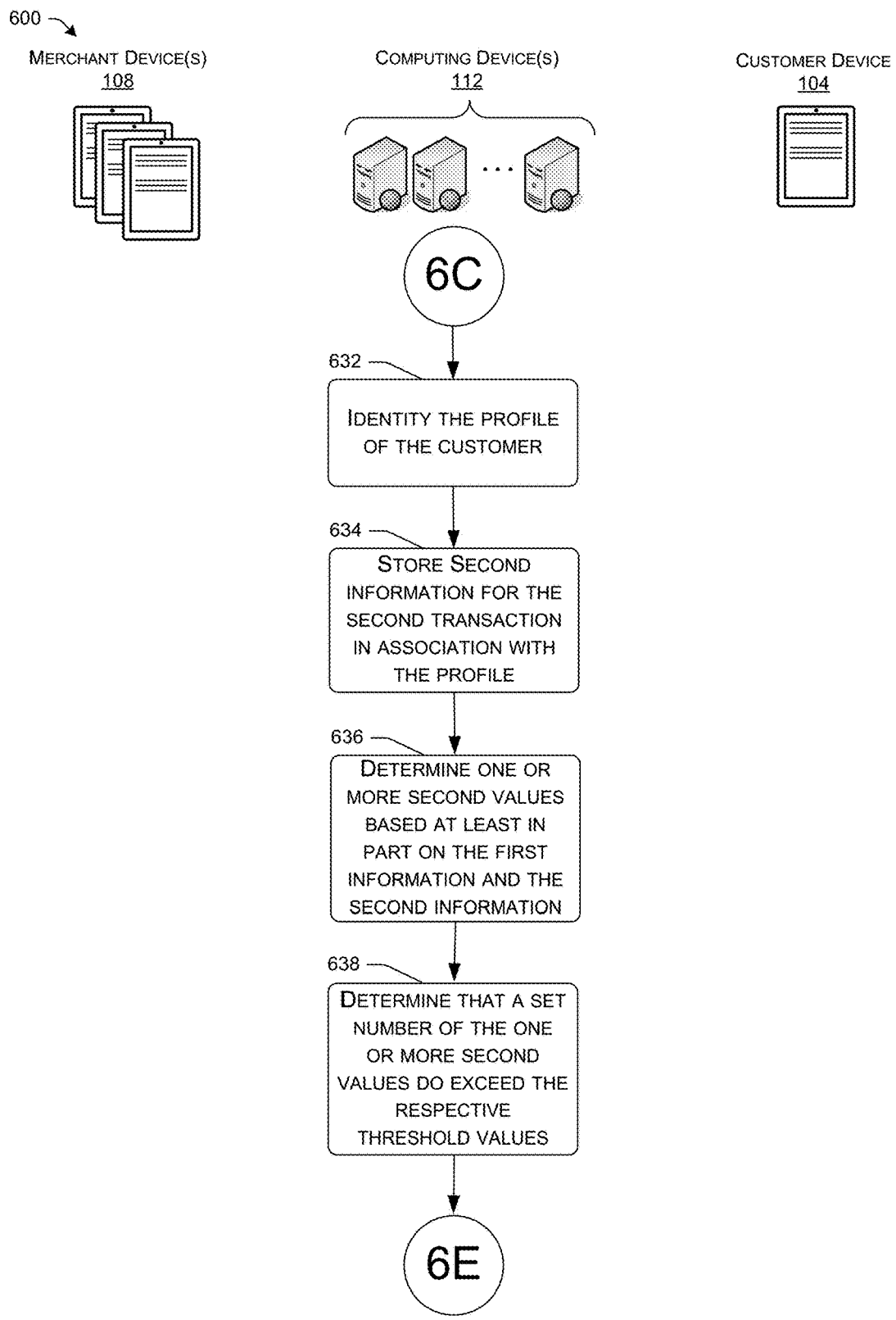
Figure 6E:
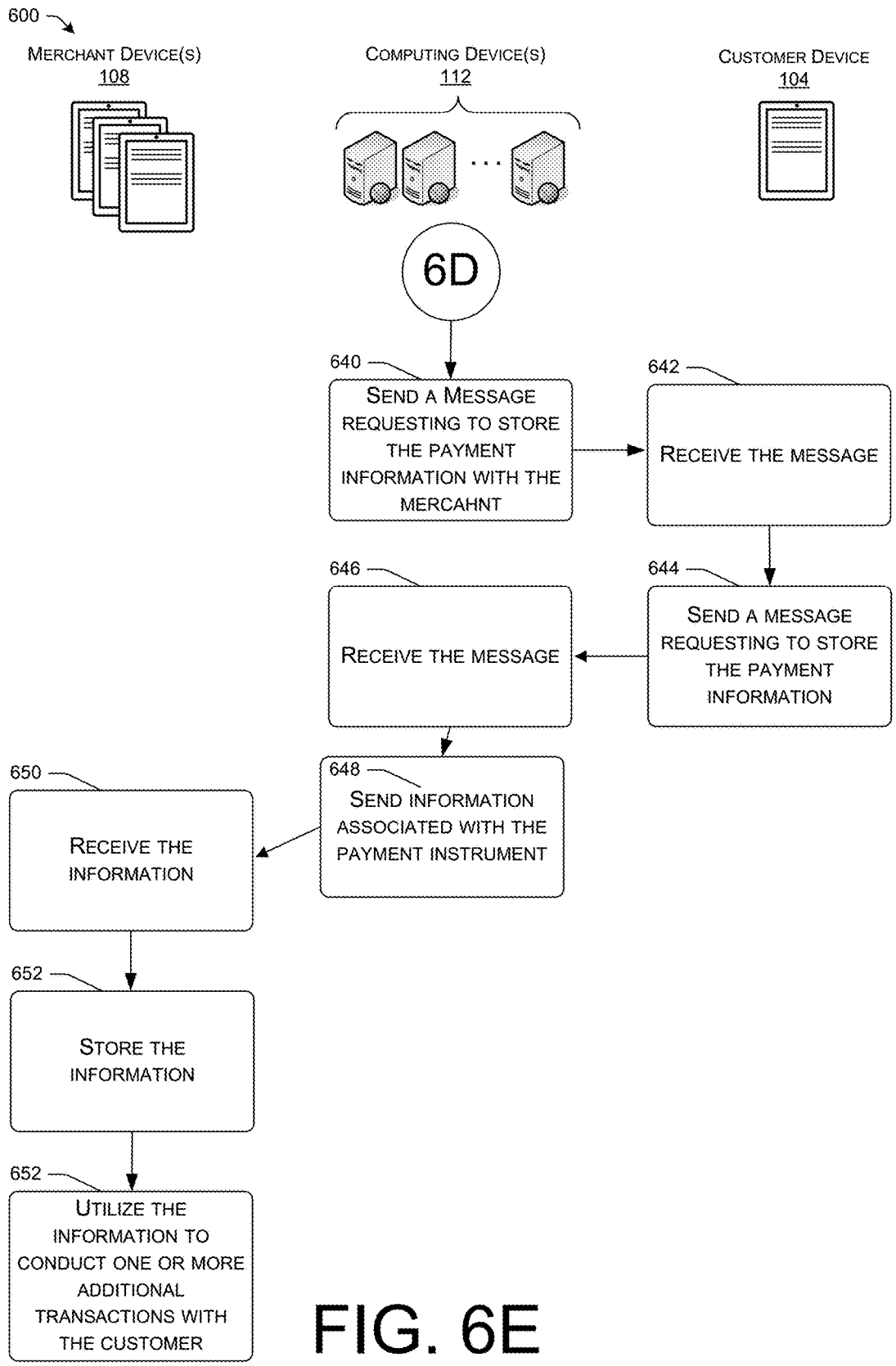

FIG. 5 illustrates an example user interface 502 that one of the merchant device(s) 108 may provide to the customer 102 during the subsequent transaction with the merchant 106. As shown, the user interface includes 502 two selectable elements, where each selectable element is associated with a respective payment instrument on file. For instance, the customer 102 can select the first selectable element 504 in order to charge the first payment instrument ending in 1234 for the subsequent transaction. Additionally, the customer 102 can select the second selectable element 506 in order to charge the second payment instrument ending in 5678 for the subsequent transaction.

FIGS. 6A-6E illustrate a flow diagram of an example process 600 for improving electronic card on file transactions. The process 600, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 600, and other processes described herein, may be performed by a payment service (e.g., the computing device(s) 112), a merchant device (e.g., merchant device(s) 108), a customer device (e.g., customer device 104), an additional electronic device, or by a combination thereof.

At 602, the merchant device(s) 108 receive payment information associated with a payment instrument of a customer. For instance, a merchant associated with the merchant device(s) 108 may be conducting a first transaction with the customer. During the first transaction, the merchant may input the card information into the merchant device(s) 108. For instance, the merchant may utilize a card reader connected to the merchant device(s) 108 to read the payment information from the payment instrument.

At 604, the merchant device(s) 108 send a first request to process the payment instrument for a first cost of a first transaction and at 606, the computing device(s) 112 receive the first request. For instance, based on receiving the payment information, the merchant device(s) 108 may send the first request to process the payment instrument to the computing device(s) 112. The computing device(s) 112 can receive the first request from the merchant device(s) 108 and, in response, attempt to authorize the payment instrument for the cost of the first transaction. Additionally, in some instances, the computing device(s) 112 can send the merchant device(s) 108 a message that indicates whether the payment instrument was authorized for the first transaction.

At 608, the merchant device(s) 108 receive contact information associated with the customer. For instance, during the first transaction, the merchant may request the contact information from the customer. In some instances, the merchant requests the contact information so that the merchant can send a digital receipt for the first transaction to the customer. The merchant and/or the customer can then input the contact information into the merchant device(s) 108. As discussed above, the contact information can include an email address, telephone number, home address, fax number, or any other type of contact information that can be used to contact the customer.

At 610, the merchant device(s) send the contact information and at 612, the computing device(s) 112 receive the contact information. For instance, the merchant device(s) 108 may send the contact information to the computing device(s) 112 during the first transaction. In some instances, the merchant device(s) 108 may further store the contact information locally, within a memory, in association with an identity of the customer.

At 614, the computing device(s) 112 generate a profile for the customer and at 616, the computing device(s) 112 associate the contact information and the payment information with the profile. For instance, the computing device(s) 112 may determine that the customer does not have a profile associated with the merchant. As such, the computing device(s) 112 can generate a profile for the customer and then store the profile in a database associated with the merchant. The computing device(s) 112 can then store, in the database, the contact information and the payment information in association with the profile.

At 618, the computing device(s) 112 store first information for the first transaction in association with the profile. For instance, the computing device(s) 112 can store, in the database, the first information in association with the profile of the customer. The first information for the first transaction can include an identifier (e.g., name) of the customer, the payment information associated with the payment instrument used by the customer during the first transaction, item(s) acquired by the customer during the first transaction, a cost of the item(s) acquired by the customer during the first transaction, a time, place and date of the first transaction, and so forth.

At 620, the computing device(s) 112 determine one or more first values based at least in part on the first information. For instance, the computing device(s) 112 can analyze the first information using one or more algorithms that calculate values associated various transactions characteristics. The transaction characteristics can include a number of transactions, a total cost of transactions, and a frequency of transactions. As such, the computing device(s) 112 can analyze the first information to calculate one or more of a total number of transactions between the merchant and the customer, a total cost of transactions between the merchant and the customer, or a frequency in which transactions occur between the merchant and the customer.

For example, since the first information is associated with a first transaction between the merchant and the customer, the computing device(s) 112 may determine that the total number of transactions is one, the total cost for transactions is $50 (e.g., cost of the first transaction), and that the frequency in which transactions occur between the merchant and the customer is one transaction per year (e.g., since this is the first transaction). In some instances, the computing device(s) 112 store data associated with the one or more first values in the database in association with the profile of the customer.

At 622, the computing device(s) 112 determine that a set number of the one or more first values do not exceed respective threshold values. For instance, the computing device(s) 112 can determine, for the one or more first values, whether each first value exceeds a respective threshold value for the respective transaction characteristic. For instance, the computing device(s) 112 can determine whether: (1) the total number of transactions between the merchant and the customer exceeds a transaction threshold (e.g., one transaction, two transaction, three transactions, etc.), (2) the total cost of the transactions between the merchant and the customer exceeds a cost threshold (e.g., $100, $1,000, $10,000, etc.), or (3) the frequency in which transactions occur between the merchant and the customer exceeds a frequency threshold (e.g., one transaction a week, three transactions a month, etc.). The computing device(s) 112 can then determine whether a set number of the first values (e.g., one value, two values, three values) each exceed their respective threshold value.

For example, suppose that the set number is one value, the threshold value for total number of transactions is four transactions, the threshold value for total cost of transactions is $100, and the threshold value for frequency of transactions is two transactions per month. The computing device(s) 112 can determine that the total number of transactions (e.g., one) does not exceed the four transaction threshold, the total cost of transactions (e.g., $50) does not exceed the $100 threshold, and the frequency of transactions (e.g., one per year) does not exceed the two transactions per month threshold. As such, the computing device(s) 112 can determine that the set number is not satisfied.

At 624, the computing device(s) 112 refrain from sending a message to the customer. For instance, based on determining that none of the one or more first values exceeds their respective threshold value, the computing device(s) 112 can determine not to send the message to the customer via the contact information. In some instances, the message includes a request to store the payment information associated with the payment instrument with the merchant. The computing device(s) 112 can further determine to continue monitoring the transaction activity between the merchant and the customer.

At 626, the merchant device(s) 108 receive the payment information associated with the payment instrument of the customer. For instance, the merchant associated with the merchant device(s) 108 may be conducting a second transaction with the customer. During the second transaction, the merchant may input the card information into the merchant device(s) 108. For instance, the merchant may utilize a card reader connected to the merchant device(s) 108 to read the payment information from the payment instrument.

At 628, the merchant device(s) 108 send a second request to process the payment instrument for a second cost of a second transaction and at 630, the computing device(s) 112 receive the second request. For instance, based on receiving the payment information, the merchant device(s) 108 may send the second request to process the payment instrument to the computing device(s) 112. The computing device(s) 112 can receive the second request from the merchant device(s) 108 and, in response, attempt to authorize the payment instrument for the second cost of the second transaction. Additionally, in some instances, the computing device(s) 112 can send the merchant device(s) 108 a message that indicates whether the payment instrument was authorized for the second transaction.

At 632, the computing device(s) 112 identify the profile of the customer. For instance, the computing device(s) 112 can use information from the second request to identify the profile. In some instances, the computing device(s) 112 identify the profile using the payment information from the second request. In some instances, the computing device(s) 112 identify the profile using an identity of the customer with the second request.

At 634, the computing device(s) 112 store second information for the second transaction in association with the profile. For instance, the computing device(s) 112 can store, in the database, the second information in association with the profile of the customer. The second information for the second transaction can indicate an identifier (e.g., name) of the customer, the payment information associated with the payment instrument used by the customer during the second transaction, item(s) acquired by the customer during the second transaction, a cost of the item(s) acquired by the customer during the second transaction, a time, place and date of the second transaction, and so forth.

At 636, the computing device(s) 112 determine one or more second values based at least in part on the first information and the second information. For instance, the computing device(s) 112 can analyze the first information and the second information using the one or more algorithms that calculate values associated the various transaction characteristics. As discussed above, the transaction characteristics can include a number of transactions, a total cost of transactions, and a frequency of transactions. As such, the computing device(s) 112 can analyze the first information and the second information to calculate one or more of a total number of transactions between the merchant and the customer, a total cost of transactions between the merchant and the customer, or a frequency in which transaction occur between the merchant and the customer.

For example, since the first and second information is associated with two transactions between the merchant and the customer, the computing device(s) 112 may determine that the total number of transactions is two, the total cost for transactions is $120 (e.g., first cost of the first transaction and second cost of the second transaction combined), and that the frequency in which transactions occur between the merchant and the customer is two transactions per week (e.g., since the first and second transactions were conducted in the same week). In some instances, the computing device(s) 112 store data associated with the one or more second values in the database in association with the profile of the customer.

At 638, the computing device(s) 112 determine that a set number of the one or more second values do exceed the respective threshold values. For instance, the computing device(s) 112 can determine, for the one or more second values, whether each second value exceeds a respective threshold value for the respective transaction characteristic. For instance, the computing device(s) 112 can determine whether: (1) the total number of transactions between the merchant and the customer exceeds a transaction threshold (e.g., one transaction, two transaction, three transactions, etc.), (2) the total cost of the transactions between the merchant and the customer exceeds a cost threshold (e.g., $100, $1,000, $10,000, etc.), or (3) the frequency in which transactions occur between the merchant and the customer exceeds a frequency threshold (e.g., one transaction a week, three transactions a month, etc.). The computing device(s) 112 can then determine whether a set number of the second values (e.g., one value, two values, three values) each exceed their respective threshold value.

For example, and based on the example above, the computing device(s) 112 can determine that the total number of transactions (e.g., two) does not exceed the four transaction threshold. However, the computing device(s) 112 can determine that the total cost of transactions (e.g., $120) does exceed the $100 threshold, and that the frequency in which transactions occur between the merchant and the customer (e.g., one per week) does exceed the two transactions per month threshold. As such, the computing device(s) 112 can determine that a set number of the one or more second values does exceed their respective threshold values, since two of the values each exceed their respective threshold value. The second values may also be weighted based on transaction activity associated with the customer and maintained by the payment service. For instance, based on the transaction activity or card on file status of the customer as associated with other merchants, the payment service may determine that a frequency and cost should be weighted more than the number of transactions in the event a customer typically makes one large purchase a few times a week at various merchants, or a transaction cost and number of transactions should be weighted more than the frequency in the event a customer infrequently purchases a number of high valued items with at least one other merchant, etc.

At 640, the computing device(s) 112 send a message requesting to store the payment information with the merchant and at 642, the customer device 104 receives the message. For instance, based on determining that the set number of the one or more second values exceed their respective threshold values, the computing device(s) 112 can send a message to the customer, via the contact information, requesting that the customer save the payment information with the merchant. The customer can then use the customer device 104 to receive and display the message.

At 644, the customer device 104 sends a message requesting to store the payment information and at 646, the computing device(s) 112 receive the message. For instance, the customer device 104 can receive input from the customer indicating that the customer would like to store the payment information with the merchant. In some instances, the input can include a selection of an interactive element. The customer device 104 can then send the computing device(s) 112 the message indicating that the customer wants to store the payment information with the merchant.

At 648, the computing device(s) 112 send information associated with the payment instrument. For instance, based on receiving the message from the customer device 104, the computing device(s) 112 can send the merchant device(s) 108 information associated with the payment instrument. In some instances, the information includes the payment information associated with the payment instrument. In some instances, the information includes additional information associated with the payment instrument that the merchant device(s) 108 can use to charge the payment instrument. For instance, the additional information can include an identifier of the customer, a portion of the payment information, an expiration data for the payment instrument, a proxy code and/or number that the computing device(s) 112 generate, and/or the like. In some instances, the computing device(s) 112 can first encrypt the information before sending the information to the merchant device(s) 108.

At 650, the merchant device(s) 108 receive the information and at 652, the merchant device(s) 108 store the information. For instance, the merchant device(s) 108 can receive the information from the computing device(s) 112. In response, the merchant device(s) 108 can store the information in association with an identity of the customer. In some instances, the merchant device(s) 108 store the information in a local memory.

At 652, the merchant device(s) 108 use the information to conduct one or more additional transactions with the customer. For instance, the merchant device(s) 108 can receive input associated with a subsequent transaction between the merchant and the customer. Based on receiving the input, the merchant device(s) 108 can send a request to process the payment instrument for a cost of the subsequent transaction to the computing device(s) 112. In some instances, the request includes the payment information stored on the merchant device(s) 108. In some instances, the request includes other information associated with the payment instrument that the computing device(s) 112 can use to authorize the payment instrument.

Figure 7:
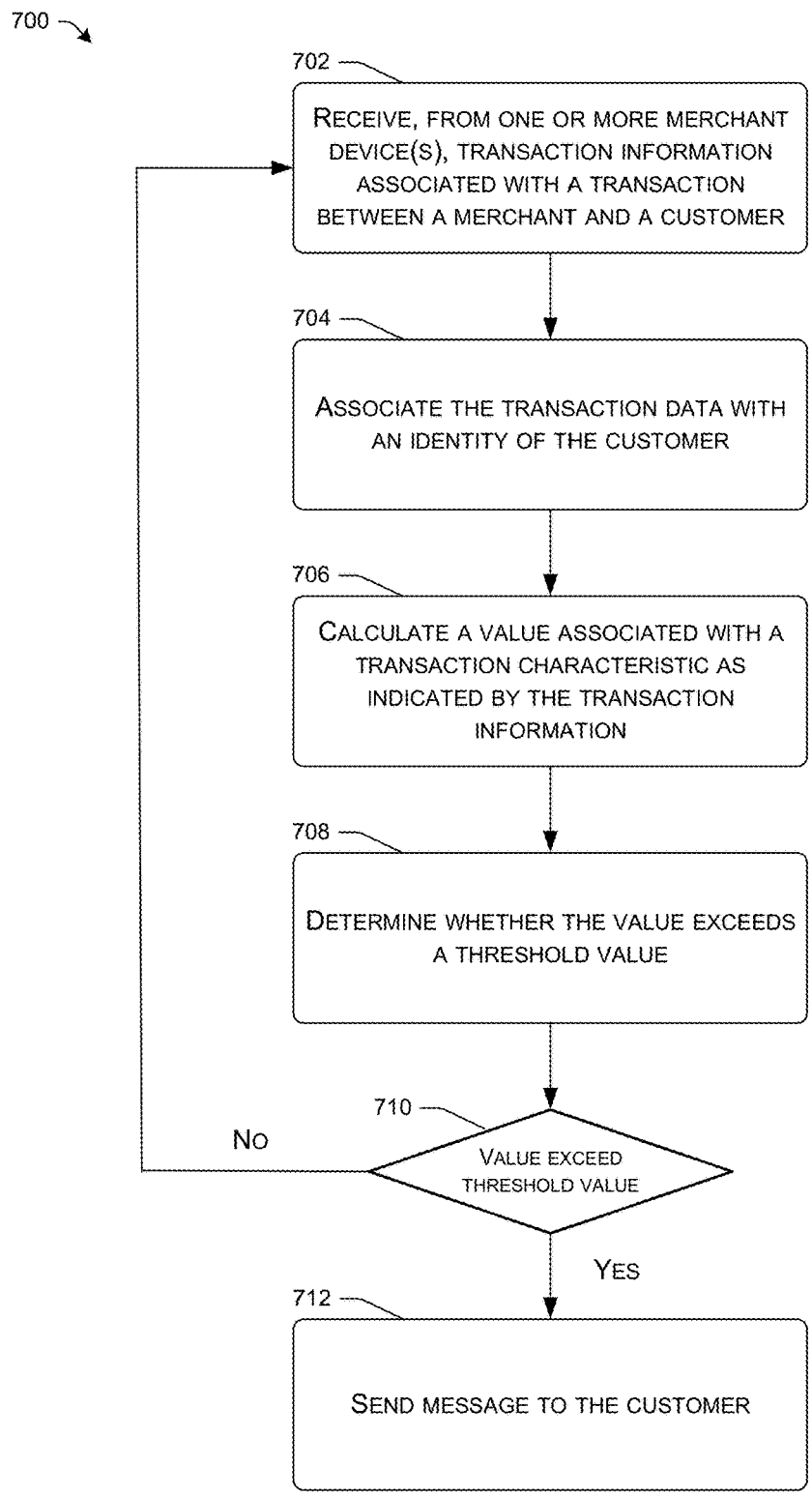
FIG. 7 illustrates a flow diagram of an example process for analyzing transaction information to determine when to send, to the customer, a message requesting that the customer save payment information with a merchant.

FIG. 7 illustrates a flow diagram of an example process 700 for analyzing transaction information to determine when to send a message requesting that a customer save payment information with a merchant.

At 702, the computing device(s) 112 receive, from one or more merchant device, transaction information associated with a transaction between a merchant and a customer. The transaction information for the transaction can indicate an identifier (e.g., name) of the customer, the payment information associated with the payment instrument used by the customer during the transaction, item(s) acquired by the customer during the transaction, a cost of the item(s) acquired by the customer during the transaction, a time, place and date of the transaction, and so forth.

At 704, the computing device(s) 112 associate the transaction information with an identity of the customer. For instance, the computing device(s) 112 can determine whether the customer is associated with a profile. If the customer is not associated with a profile, the computing device(s) 112 can generate a profile for the customer. The computing device(s) 112 can then store the transaction information in association with the profile of the customer.

At 706, the computing device(s) 112 calculate a value associated with a transaction characteristic as indicated by the transaction information. For instance, the computing device(s) 112 can analyze the transaction information using one or more algorithms that determine values associated various transaction characteristics. As discussed above, the transaction characteristics can include a number of transactions, a total cost of transactions, and a frequency of transactions. As such, the computing device(s) 112 can analyze the transaction information to determine one or more of a total number of transactions between the merchant and the customer, a total cost of transactions between the merchant and the customer, or a frequency in which transaction occur between the merchant and the customer.

At 708, the computing device(s) 112 determine whether the value exceeds a threshold value. For instance, the computing device(s) 112 can determine whether the total number of transactions between the merchant and the customer exceeds a transaction threshold, whether the total cost of transactions between the merchant and the customer exceeds a cost threshold, or whether a frequency in which transaction occur between the merchant and the customer exceed a frequency threshold. In some instances, the computing device(s) 112 may only determine whether one of the values exceeds its respective threshold. In some instances, the computing device(s) 112 may determine whether two or more values each exceed their respective threshold value.

At 710, based on determining that the value does not exceed the threshold value, the process 700 can repeat from step 702. For instance, the computing device(s) 112 can receive, from the one or more merchant device, transaction information associated with an additional transaction between the merchant and the customer. The computing device(s) 112 can then associate the additional transaction information in association with the profile, determine a value associated with the transaction characteristic as indicated by all of transaction information (e.g., the transaction information analyzed above and the additional transaction information), and determine whether the value exceeds the transaction threshold.

Additionally, at 710, based on determining that the value exceeds the threshold value, the process 700 moves to step 712. At 712, the computing device(s) 112 send a message to the customer. For instance, the computing device(s) 112 can send a message to the customer, via contact information associated with the customer, requesting that the customer store payment information associated with a payment instrument with the merchant.

Figure 8:
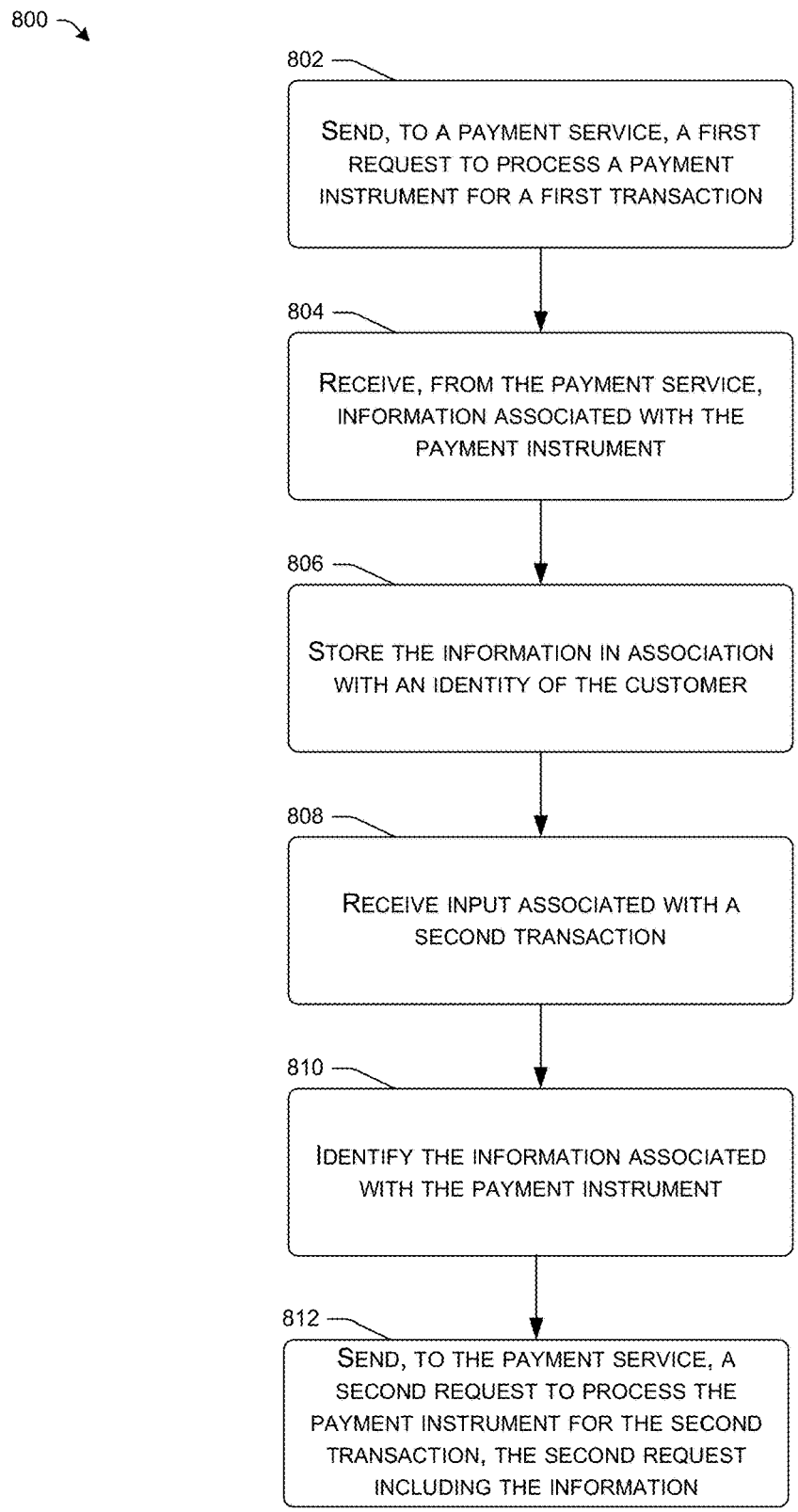
FIG. 8 illustrates a flow diagram of an example process for using stored information to process a transaction between a merchant and a customer.

FIG. 8 illustrates a flow diagram of an example process 800 for using stored information to process a transaction between a merchant and a customer. At 802, a merchant device sends, to a payment service, a first request to process a first transaction. For instance, the merchant device may receive input associated with the first transaction, such as item(s) ordered by a customer, payment information associated with a payment instrument, or the like. The merchant device can then send the first request to process the first transaction to the payment service, where the first request includes at least the payment information and an indication of the cost of the first transaction.

At 804, the merchant device receives, from the payment service, information associated with the payment instrument. For instance, the merchant device can receive information associated with the payment information that the merchant device can use during subsequent transactions to charge the payment instrument. In some instances, the information can include the payment information associated with the payment instrument. In some instances, the information can include a portion of the payment instrument, such as the last four digits of an account number. In some instances, the information can be encrypted so that the merchant and/or another user cannot retrieve the payment information using the received information.

At 806, the merchant device stores the information in association with an identity of the customer. For instance, based on receiving the information, the merchant device can store, in a database, the information in association with the identity of the customer. In some instances, the merchant device first generates a profile for the customer. In such instances, the merchant device can store, in the database, the information in association with the profile.

At 808, the merchant device receives input associated with a second transaction and at 810, the merchant device identifies the information associated with the payment instrument. For instance, the merchant device can receive input indicating one or more items ordered by the customer from the merchant during a subsequent transaction. The input can further indicate the identity of the customer. Based on receiving the input, the merchant device can search through the database using the identity of the merchant in order to identity the information associated with the customer. In some instances, the merchant device then displays a selectable element that the customer can select to charge the payment instrument.

At 810, the merchant device sends, to the payment service, a second request to process the payment instrument for the second transaction, the second request including the information. For instance, based on identifying the information, the merchant device can send the payment service the second request to process the payment instrument for the second transaction, where the second request includes the information. As discussed above, in some instances, the information can include the payment information. In some instances, the information can include a portion of the payment information.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    receiving, at one or more servers associated with a payment processing service and from one or more merchant devices associated with a merchant, first transaction information associated with a first transaction between the merchant and a customer, the first transaction information including at least payment information of a payment instrument used during the first transaction, a merchant device of the one or more merchant devices executing an instance of a merchant application installed for configuring the merchant device as a point-of-sale (POS) terminal, the instance of the merchant application configuring the POS terminal to communicate at least the first transaction information over a network to the payment processing service;
    receiving, at one or more servers and from the one or more merchant devices, contact information associated with the customer;
    associating, by the one or more servers, the contact information with an identity of the customer;
    receiving, by the one or more servers and from the one or more merchant devices, second transaction information associated with a second transaction between the merchant and the customer, the second transaction information including at least the payment information of the payment instrument, the instance of the merchant application configuring the POS terminal to additionally communicate the second transaction information over the network to the payment processing service;
    analyzing, by the one or more servers, the first transaction information and the second transaction information to determine one or more transaction characteristics;
    calculating, by the one or more servers and based at least in part on analyzing the first transaction information and the second transaction information, a value associated with at least one transaction characteristic;
    determining, by the one or more servers, that the value exceeds a threshold value associated with the at least one transaction characteristic;
    based at least in part on determining that the value exceeds the threshold value, sending, from the one or more servers and to a device operated by the customer, a first message that includes a first request to store the payment information in association with the merchant, the customer being identifiable based at least in part on the contact information;
    receiving, at the one or more servers and from the device, a second message that includes a second request to store the payment information in association with the merchant; and
    based at least in part on receiving the second message, storing, by the one or more servers and in a database, the payment information in association with the identity of the customer, wherein storing the payment information in association with the identity of the customer allows the POS terminal or the payment processing service to use the payment information for subsequent transactions without subsequently reading or receiving the payment information at the POS terminal.

2. The method as recited in claim 1, wherein:
    the at least one transaction characteristic is a number of transactions;
    calculating the value associated with the at least one transaction characteristic comprises calculating, based at least in part on analyzing the first transaction information and the second transaction information, a total number of transactions between the merchant and the customer; and
    determining that the value exceeds the threshold value comprises determining that the total number of transactions between the merchant and the customer exceeds a transaction threshold.

3. The method as recited in claim 1, wherein:
    the at least one transaction characteristic is a cost of transactions;
    calculating the value associated with the at least one transaction characteristic comprises calculating, based at least in part on analyzing the first transaction information and the second transaction information, a total cost associated with transactions between the merchant and the customer; and determining that the value exceeds the threshold value comprises determining that the total cost exceeds a cost threshold.

4. The method as recited in claim 1, wherein:
the at least one transaction characteristic is a frequency of transactions;
calculating the value associated with the at least one transaction characteristic comprises calculating, based at least in part on analyzing the first transaction information and the second transaction information, a frequency in which the merchant conducts transactions with the customer; and
determining that the value exceeds the threshold value comprises determining that the frequency in which the merchant conducts transactions with the customer exceeds a frequency threshold.

5. The method as recited in claim 1, further comprising sending, to the one or more merchant devices, information associated with the payment instrument.

6. The method as recited in claim 5, further comprising:
receiving, from the one or more merchant devices, a request to process a third transaction between the merchant and the customer, the request including at least a portion of the information associated with the payment instrument;
identifying the payment information using at least the portion of the information; and
attempting to authorize the payment instrument for the third transaction using the payment information.

7. The method as recited in claim 1, wherein, before receiving the second transaction information, the method further comprises:
analyzing the first transaction information to determine the one or more transaction characteristics;
calculating, based at least in part on analyzing the first transaction information, an initial value associated with the at least one transaction characteristic;
determining that the initial value does not exceed the threshold value associated with the at least one transaction characteristic; and
refraining from sending a third message that includes a third request to store the payment information in association with the merchant.

8. The method as recited in claim 1, wherein the value includes a first value, the at least one transaction characteristic includes a first transaction characteristic, and the threshold value includes a first threshold value, and wherein the method further comprises:
calculating, based at least in part on analyzing the first transaction information and the second transaction information, a second value associated with a second transaction characteristic; and
determining that the second value exceeds a second threshold value associated with the second transaction characteristic,
wherein sending the first message is further based at least in part on determining that the second value exceeds the second threshold value.

9. A system associated with a payment processing service, the system comprising:
one or more processors; and
one or more computer-readable media storing instructions that, when executed by the one or more processors, cause the one or more processors to perform operations comprising:
receiving, from one or more merchant devices associated with a merchant, first transaction information associated with a first transaction between the merchant and a customer, the first transaction information including at least payment information of a payment instrument used during the first transaction, a merchant device of the one or more merchant devices executing an instance of a merchant application installed for configuring the merchant device as a point-of-sale (POS) terminal, the instance of the merchant application configuring the POS terminal to communicate at least the first transaction information over a network to the payment processing service;
receiving, from the one or more merchant devices, contact information associated with the customer;
associating the contact information with an identity of the customer;
receiving, from the one or more merchant devices, second transaction information associated with a second transaction between the merchant and the customer, the second transaction information including at least the payment information of the payment instrument;
analyzing the first transaction information and the second transaction information;
calculating, based at least in part on analyzing the first transaction information and the second transaction information, a value associated with at least one transaction characteristic;
determining that the value exceeds a threshold value associated with the at least one transaction characteristic; and
based at least in part on determining that the value exceeds the threshold value, sending, to a device operated by the customer identifiable via the contact information, a message that includes a request to store the payment information in association with the merchant.

10. The system as recited in claim 9, wherein:
the at least one transaction characteristic is a number of transactions;
calculating the value associated with the at least one transaction characteristic comprises calculating, based at least in part on analyzing the first transaction information and the second transaction information, a total number of transactions between the merchant and the customer; and
determining that the value exceeds the threshold value comprises determining that the total number of transactions between the merchant and the customer exceeds a transaction threshold.

11. The system as recited in claim 9, wherein:
the at least one transaction characteristic is a cost of transactions;
calculating the value associated with the at least one transaction characteristic comprises calculating, based at least in part on analyzing the first transaction information and the second transaction information, a total cost associated with transactions between the merchant and the customer; and
determining that the value exceeds the threshold value comprises determining that the total cost exceeds a cost threshold.

12. The system as recited in claim 9, wherein:
the at least one transaction characteristic is a frequency of transactions;
calculating the value associated with the at least one transaction characteristic comprises calculating, based at least in part on analyzing the first transaction information and the second transaction information, a frequency in which the merchant conducts transactions with the customer; and determining that the value exceeds the threshold value comprises determining that the frequency in which the merchant conducts transactions with the customer exceeds a frequency threshold.

13. The system as recited in claim 9, the operations further comprising:

receiving, from the device, an additional message that includes an additional request to store the payment information in association with the merchant; and sending, to the one or more merchant devices, the payment information.

14. The system as recited in claim 9, the operations further comprising:

receiving, from the device, an additional message that includes an additional request to store the payment information with the merchant;

storing, in a database associated with the merchant, the payment information in association with the identity of the customer; and sending, to the one or more merchant devices, additional information associated with the payment instrument.

15. The system as recited in claim 9, wherein, before receiving the second transaction information, the operations further comprise:

analyzing the first transaction information;

calculating, based at least in part on analyzing the first transaction information, an initial value associated with the at least one transaction characteristic;

determining that the initial value does not exceed the threshold value associated with the at least one transaction characteristic; and refraining from sending an additional message that includes an additional request to store the payment information in association with the merchant.

16. One or more non-transitory computer-readable media storing instructions that, when executed by one or more processors, cause the one or more processors to perform operations comprising:

receiving, from one or more merchant devices associated with a merchant, first transaction information associated with a first transaction between the merchant and a customer, the merchant subscribing to services associated with a payment processing service, the first transaction information including at least payment information of a payment instrument used during the first transaction, a merchant device of the one or more merchant devices executing an instance of a merchant application installed for configuring the merchant device as a point-of-sale (POS) terminal, the instance of the merchant application configuring the POS terminal to communicate at least the first transaction information over a network to the payment processing service;

receiving, from the one or more merchant devices, contact information associated with the customer;

associating the contact information with an identity of the customer;

receiving, from the one or more merchant devices, second transaction information associated with a second transaction between the merchant and the customer, the second transaction information including at least the payment information of the payment instrument;

analyzing the first transaction information and the second transaction information;

calculating, based at least in part on analyzing the first transaction information and the second transaction information, a value associated with at least one transaction characteristic;

determining that the value exceeds a threshold value associated with the at least one transaction characteristic; and based at least in part on determining that the value exceeds the threshold value, sending, to a device operated by the customer identifiable based at least in part on the contact information, a message that includes a request to store the payment information in association with the merchant.

17. The one or more non-transitory computer-readable media as recited in claim 16, wherein:

the at least one transaction characteristic is a number of transactions;

calculating the value associated with the at least one transaction characteristic comprises calculating, based at least in part on analyzing the first transaction information and the second transaction information, a total number of transactions between the merchant and the customer; and determining that the value exceeds the threshold value comprises determining that the total number of transactions between the merchant and the customer exceeds a transaction threshold.

18. The one or more non-transitory computer-readable media as recited in claim 16, wherein:

the at least one transaction characteristic is a cost of transactions;

calculating the value associated with the at least one transaction characteristic comprises calculating, based at least in part on analyzing the first transaction information and the second transaction information, a total cost associated with transactions between the merchant and the customer; and determining that the value exceeds the threshold value comprises determining that the total cost exceeds a cost threshold.

19. The one or more non-transitory computer-readable media as recited in claim 16, wherein:

the at least one transaction characteristic is a frequency of transactions;

calculating the value associated with the at least one transaction characteristic comprises calculating, based at least in part on analyzing the first transaction information and the second transaction information, a frequency in which the merchant conducts transactions with the customer; and determining that the value exceeds the threshold value comprises determining that the frequency in which the merchant conducts transactions with the customer exceeds a frequency threshold.

20. The one or more non-transitory computer-readable media as recited in claim 16, wherein, before receiving the second transaction information, the operations further comprise:

analyzing the first transaction information;

calculating, based at least in part on analyzing the first transaction information, an initial value associated with the at least one transaction characteristic;

determining that the initial value does not exceed the threshold value associated with the at least one transaction characteristic; and refraining from sending an additional message that includes an additional request to store the payment information in association with the merchant.

\* \* \* \* \*